United States Patent
Hassan et al.

(10) Patent No.: US 9,565,708 B2
(45) Date of Patent: Feb. 7, 2017

(54) AUTO-CONNECT IN A PEER-TO-PEER NETWORK

(75) Inventors: Amer A. Hassan, Kirkland, WA (US);
Mitesh K. Desai, Redmond, WA (US);
Mahmoud S. Elhaddad, Kirkland, WA (US); Trideepraj Roychoudhury, Snoqualmie, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 753 days.

(21) Appl. No.: 13/112,905

(22) Filed: May 20, 2011

(65) Prior Publication Data
US 2012/0297306 A1    Nov. 22, 2012

(51) Int. Cl.
*H04W 76/02* (2009.01)
*H04W 84/12* (2009.01)

(52) U.S. Cl.
CPC ........... *H04W 76/023* (2013.01); *H04W 84/12* (2013.01)

(58) Field of Classification Search
CPC .. G06Q 20/32; G06Q 30/0267; H04M 1/7253; H04M 1/6091; H04M 2250/02; H04W 76/023; H04W 84/12
USPC ..... 715/733–747, 853, 969; 726/3; 370/338; 710/303
See application file for complete search history.

(56) References Cited

U.S. PATENT DOCUMENTS

| | | | |
|---|---|---|---|
| 5,799,086 A | 8/1998 | Sudia | |
| 6,016,476 A | 1/2000 | Maes et al. | |
| 6,166,688 A * | 12/2000 | Cromer et al. | 342/357.74 |
| 6,438,600 B1 | 8/2002 | Greenfield et al. | |
| 6,515,575 B1 | 2/2003 | Kataoka | |
| 6,748,195 B1 * | 6/2004 | Phillips | H04M 1/72569 370/338 |
| 6,772,331 B1 | 8/2004 | Hind | |
| 6,795,688 B1 * | 9/2004 | Plasson et al. | 455/41.2 |

(Continued)

FOREIGN PATENT DOCUMENTS

| | | |
|---|---|---|
| EP | 1873668 | 1/2008 |
| WO | WO 2004090781 A1 | 10/2004 |

OTHER PUBLICATIONS

Seick et al., "Bluetooth® User Interface Flow Diagrams for Bluetooth Secure Simple Pairing Devices.", copyright 2007 Bluetooth® SIG, Inc., pp. 1-54.*

(Continued)

*Primary Examiner* — Andrew Tank
(74) *Attorney, Agent, or Firm* — Qudus Olaniran; Judy Yee; Micky Minhas

(57) ABSTRACT

A wireless device that automatically forms a connection to a remote device in accordance with a peer-to-peer protocol. The remote device may be designated as an auto-connect device for the wireless device such that, when the wireless device determines that it is in the vicinity of the auto-connect device, it can re-form a connection to the remote device based on stored information for re-establishing connections among a persistent group of devices, but without any express user input. When a user requests that the wireless device perform a function that involves interaction with an auto-connect device, that function may be performed with the delay associated with forming a connection. Any of multiple techniques may be employed for identifying devices designated as auto-connect devices and for determining when the wireless device and a remote, auto-connect devices are in close proximity.

21 Claims, 14 Drawing Sheets

(56) References Cited

U.S. PATENT DOCUMENTS

| | | | |
|---|---|---|---|
| 6,941,148 B2 | 9/2005 | Hansmann et al. | |
| 6,976,253 B1 | 12/2005 | Wierman et al. | |
| 7,191,245 B2* | 3/2007 | Takayama | 709/231 |
| 7,194,689 B2* | 3/2007 | Manni et al. | 715/735 |
| 7,221,939 B2* | 5/2007 | Ylitalo et al. | 455/435.1 |
| 7,236,742 B2 | 6/2007 | Hall et al. | |
| 7,248,858 B2 | 7/2007 | Barber et al. | |
| 7,616,594 B2* | 11/2009 | Roberts et al. | 370/310 |
| 7,660,578 B2 | 2/2010 | Viitamaki et al. | |
| 7,716,585 B2* | 5/2010 | Glass | 715/734 |
| 8,224,246 B2* | 7/2012 | Suumaki et al. | 455/41.1 |
| 8,254,902 B2* | 8/2012 | Bell et al. | 455/419 |
| 8,312,392 B2* | 11/2012 | Forutanpour et al. | 715/863 |
| 8,331,987 B2* | 12/2012 | Rosenblatt | 455/556.2 |
| 8,462,734 B2* | 6/2013 | Laine et al. | 370/331 |
| 8,473,325 B2* | 6/2013 | Barnhill et al. | 705/7.29 |
| 8,499,079 B2* | 7/2013 | Giles et al. | 709/226 |
| 8,554,970 B2* | 10/2013 | Suumaki et al. | 710/303 |
| 8,576,870 B2* | 11/2013 | Heerboth | 370/431 |
| 8,634,771 B2* | 1/2014 | Hassan et al. | 455/41.1 |
| 2003/0100307 A1 | 5/2003 | Wolochow | |
| 2003/0186697 A1* | 10/2003 | Bazin et al. | 455/434 |
| 2004/0128345 A1 | 7/2004 | Robinson et al. | |
| 2005/0289265 A1 | 12/2005 | Illowsky et al. | |
| 2006/0064493 A1 | 3/2006 | Hammell et al. | |
| 2006/0075467 A1 | 4/2006 | Sanda | |
| 2006/0084381 A1* | 4/2006 | Hartwig | H04W 4/02 455/41.2 |
| 2006/0084417 A1* | 4/2006 | Melpignano et al. | 455/418 |
| 2006/0085639 A1 | 4/2006 | Phillips et al. | |
| 2006/0090200 A1* | 4/2006 | Oie | 726/7 |
| 2006/0172701 A1 | 8/2006 | Kienhoefer et al. | |
| 2006/0183462 A1 | 8/2006 | Kolehmainen et al. | |
| 2006/0199536 A1 | 9/2006 | Eisenbach | |
| 2006/0200856 A1 | 9/2006 | Salowey et al. | |
| 2006/0218549 A1 | 9/2006 | Hsu et al. | |
| 2006/0223516 A1 | 10/2006 | Fan et al. | |
| 2007/0105548 A1 | 5/2007 | Mohan et al. | |
| 2007/0232272 A1 | 10/2007 | Gonsalves et al. | |
| 2007/0274422 A1 | 11/2007 | Shivaji-Rao et al. | |
| 2008/0076389 A1 | 3/2008 | Lee et al. | |
| 2008/0102793 A1 | 5/2008 | Ananthanarayanan | |
| 2008/0112354 A1 | 5/2008 | Toutonghi | |
| 2009/0170479 A1* | 7/2009 | Jarenskog | 455/414.1 |
| 2010/0040233 A1* | 2/2010 | Ganapathy | 380/277 |
| 2010/0159908 A1* | 6/2010 | Chang | H04M 1/72569 455/418 |
| 2010/0222080 A1* | 9/2010 | Carreras | H04W 4/02 455/456.3 |
| 2011/0264772 A1* | 10/2011 | Krapf et al. | 709/220 |
| 2012/0179737 A1* | 7/2012 | Baranov et al. | 709/201 |
| 2012/0185910 A1* | 7/2012 | Miettinen et al. | 726/1 |
| 2012/0243524 A1* | 9/2012 | Verma et al. | 370/338 |

OTHER PUBLICATIONS

Kalofonos et al., "IntuiSec: A Framework for Intuitive User Interaction with Smart Home Security Using Mobile Devices", 18th Annual IEEE International Symposium on Personal, Indoor and Mobile Radio Communications (PIMRC'07), copyright IEEE 2007, pp. 1-5.*
Wan, "Implementation for Simplifying Bluetooth Device Connection Methods", submitted to the Department of Electrical Engineering and Computer Science on May 25, 2004, copyright Massachusetts Institute of Technology 2004, pp. 1-64.*
WeFi—Automatic WiFi—Published Date: Dec. 3, 2009 http://www.androidtapp.com/wefi-automatic-wifi/.
Wi-Fi Direct to Simplify Peer-to-Peer Wireless Networking—Published Date: Oct. 14, 2009 http://www.macrumors.com/2009/10/14/wi-fi-direct-to-simplify-peer-to-peer-wireless-networking/.
Proximal Interactions: A Direct Manipulation Technique for Wireless Networking—Published Date: 2003 http://www.سonyesl.co.jp/person/rekimoto/papers/int3.pdf.
Proximity-based Authentication of Mobile Devices—Published Date: 2009 http://www.cs.toronto.edu/~walex/papers/scannell2009proximity.pdf.
U.S. Appl. No. 12/191,724, filed Aug. 14, 2008, Narayanan Ganapathy.
U.S. Appl. No. 12/191,752, filed Aug. 14, 2008, Narayanan Ganapathy.
U.S. Appl. No. 13/047,583, filed Mar. 14, 2011, Henrique Filgueiras.

* cited by examiner

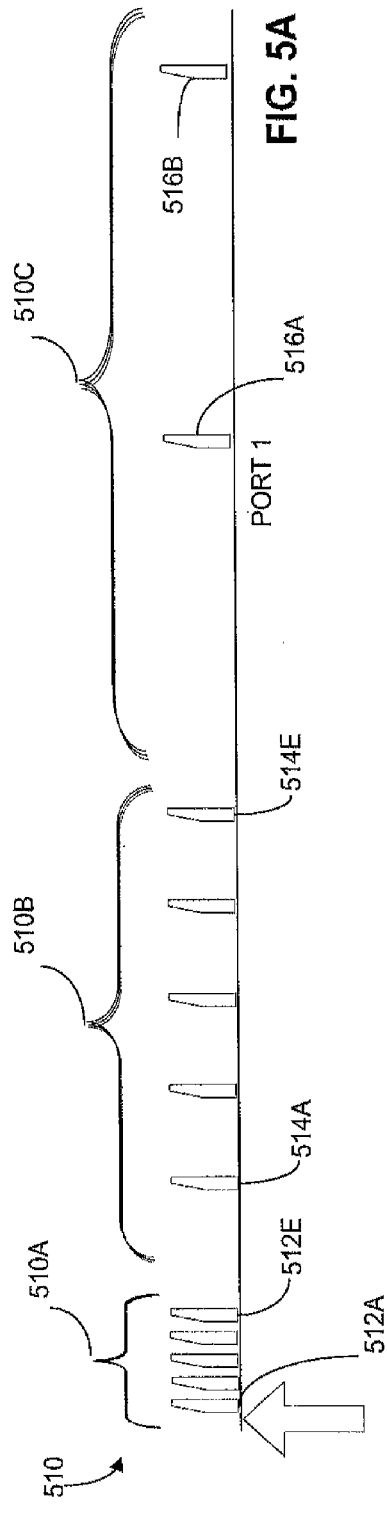
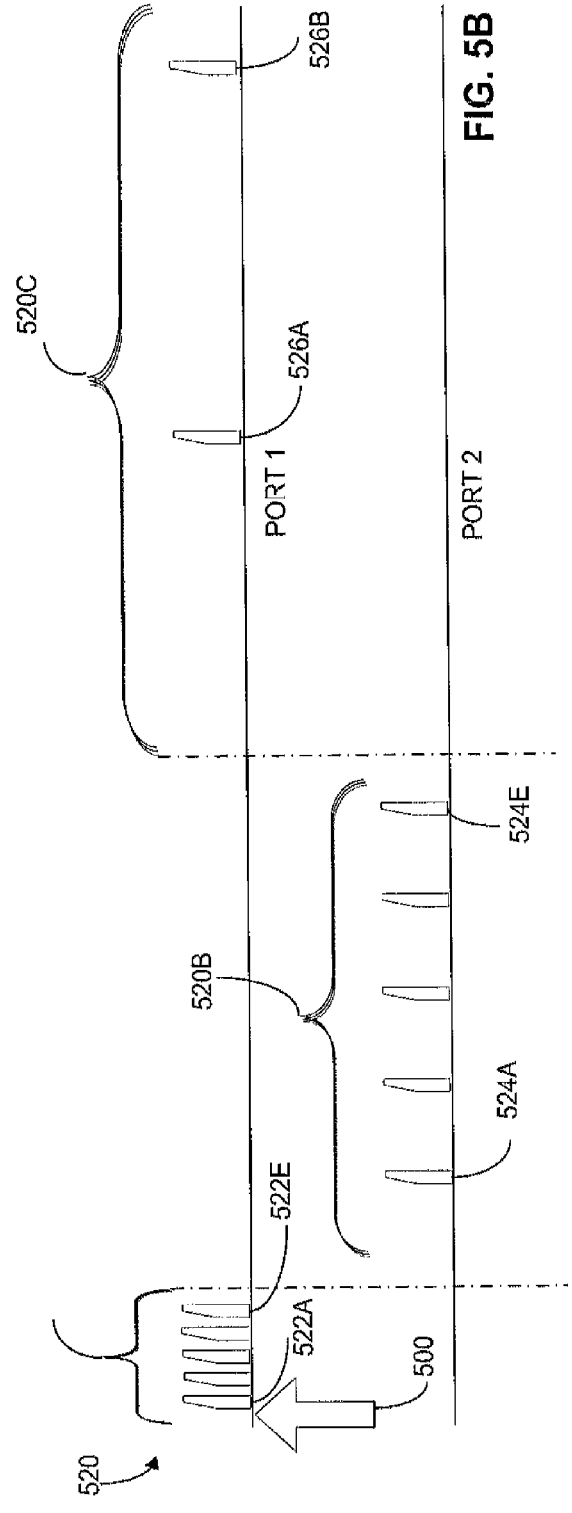

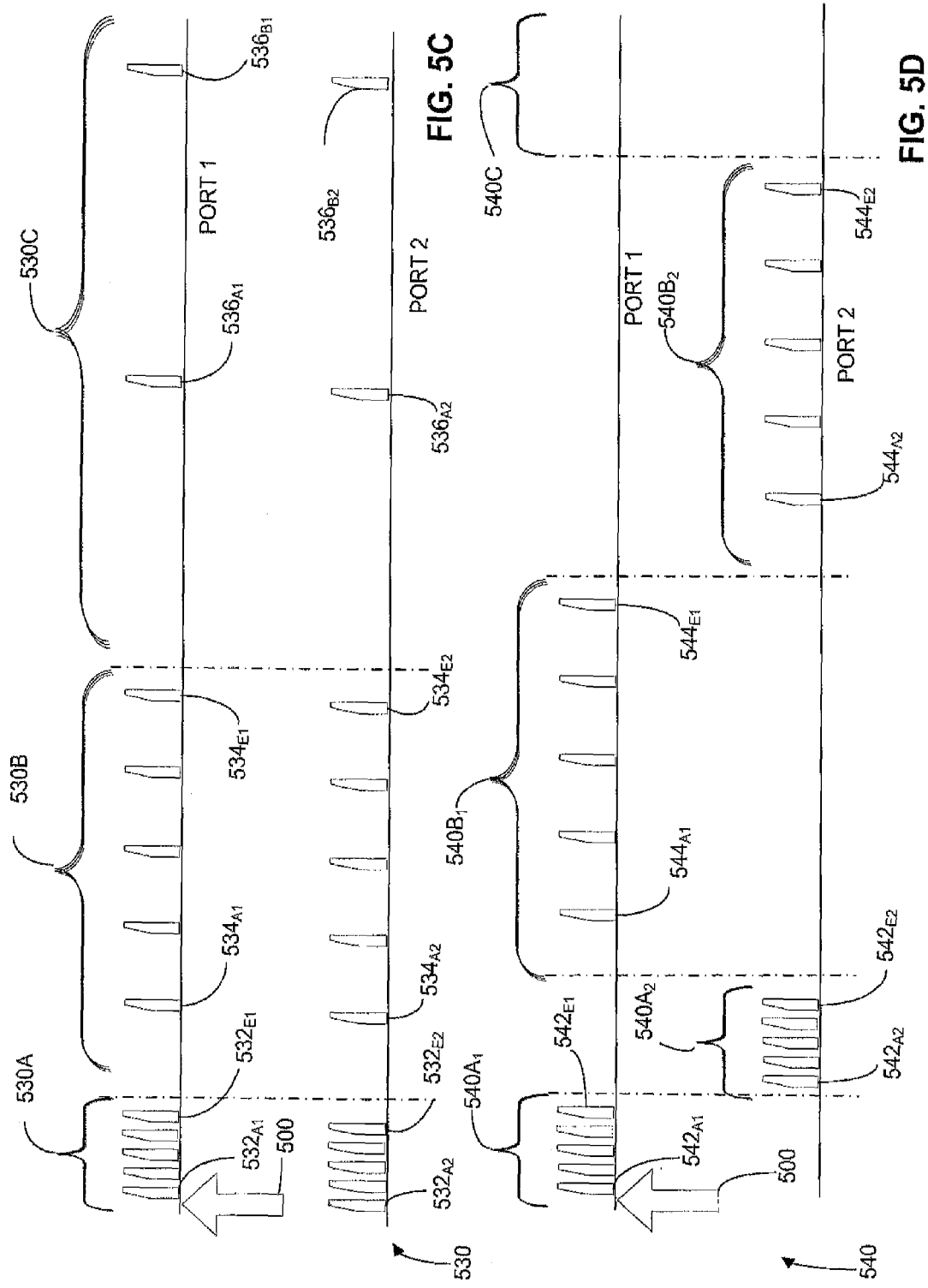

AUTO-CONNECT IN A PEER-TO-PEER NETWORK

BACKGROUND

Many computers today have radios to support wireless communication. Wireless communication is used, for example, to connect to an access point of a network. By associating with the access point, a wireless computer can access devices on the network or on other networks reachable through that network, such as the Internet. As a result, the wireless computer can exchange data with many other devices, enabling many useful functions.

To enable computers to be configured for association with an access point, it is common for the access points to operate according to a standard. A common standard for devices that connect to access points is called Wi-Fi. This standard was promulgated by the Wi-Fi Alliance, and is widely used in portable computers. There are multiple versions of this standard, but any of them can be used to support connections through access points.

Wireless communications may also be used to form connections directly to other devices without using an access point. These connections are sometimes called "peer-to-peer" connections and may be used, for example, to allow a computer to connect to a mouse or keyboard wirelessly. Wireless communications for these direct connections also have been standardized. A common standard for such wireless communications is called Bluetooth®.

In some instances, a wireless computer may concurrently connect to other devices through an access point and as part of a group engaging in peer-to-peer communications. To support such concurrent communication, some computers have multiple radios. More recently a standard has been proposed, called Wi-Fi Direct, that enables both an infrastructure connection and communication as part of a peer-to-peer group with similar wireless communications that can be processed with a single radio. This standard, also published by the Wi-Fi Alliance, extends the popular Wi-Fi communications standard for infrastructure-based communications to support direct connections.

Such direct connections may be formed among groups of devices. In accordance with the Wi-Fi Direct standard, devices that wish to communicate may exchange messages, formatted as action frames, to form a group. Initially forming a group may require user input, such as to enter a PIN or other information that serves to authorize devices to connect with one another. This process of forming an initial connection is sometimes called "pairing."

The Wi-Fi Direct standard includes a mechanism by which devices retain information about other devices with which they have paired. In this way, devices may form persistent groups such that the devices can communicate if a connection between the devices is interrupted. Such an interruption can happen, for example, if one device is turned off or the devices move out of communication range. When the connection between devices in a persistent group is broken, if those devices are later able to support a connection between them, the peer to peer group may reform without repeating the pairing process.

There are many scenarios in which such a persistent connection may be re-formed. A persistent connection between a computer and a display device, for example, may be re-formed when a user of the computer presses a hot key indicating that the user would like information streamed to a display. This action by the user may trigger the computer to re-establish a connection to the display. As another example, a persistent connection between two computers may be re-formed when a user of one computer inputs a command to transfer a file between these computers. These scenarios have in common that the connection is re-formed in response to a user action that operates as a command to re-form the connection.

SUMMARY

A device configured to operate according to a peer-to-peer communication protocol may be configured to automatically locate and connect to one or more remote devices without an express user action operating as a command to re-form the connection. Auto-connect may be used in conjunction with devices that are of a type that a user may expect to be available when close together. An example of such devices may include a computing device and a human interface device (HID), such as a wireless mouse or wireless keyboard. Another example may be a printer or a mobile phone. Accordingly, in some embodiments, an auto-connect device may be identified based on a type, functionality or other characteristic of the device.

A wireless device may obtain information about the characteristics of a remote device in any suitable way. Such information may be obtained directly from the remote device itself. In other embodiments, a wireless device may obtain information about a remote device over a network connection, such as from a server connected to the Internet. Information about a remote device may also be obtained through an intermediary device.

Information instead of or in addition to a device characteristic may be used to identify a remote device that is an auto-connect device. In some embodiments, context may be used to determine whether an auto-connection is to be formed. For example, when a wireless device is in a home setting or a personal office setting, an auto-connection may be formed to a device. In contrast, in a conference room or shared office setting, a wireless device may forego a connection to a device, even though of the same type Alternatively or additionally, auto-connect devices may be identified based user input. In some embodiments, an auto-connect device may be designated by a user of a wireless device during an initial pairing between the wireless device and the auto-connect device.

Regardless of how an auto-connect device for a wireless device is designated, an auto-connection may be initiated when the wireless device detects the auto-connect device in its vicinity. In some embodiments, a wireless device may scan for auto-connect devices. As part of the scan, the wireless device may detect one or more remote devices designated as auto-connect devices. The scan may be performed according to a pattern that leads to rapid identification of an auto-connect device in scenarios in which a user is likely to want to use the device, but with limited drain on a battery of a battery operated wireless device. Such a scan may entail transmission of queries in response to a trigger event. The queries may be transmitted at intervals that increase over time.

In scenarios in which a wireless device has been configured to auto-connect to more than one remote device, the wireless device may employ a scan pattern that suitably provides a likelihood that auto-connect devices in the vicinity of the wireless device will be discovered. In embodiments in which the wireless device has multiple ports that will support peer-to-peer communication, an auto-connect device may be assigned to an available port. The wireless device may then scan through the port for the assigned auto-connect device in accordance with a scan pattern.

In scenarios in which a wireless device has been configured to recognize more auto-connect devices than there are available ports, one or more criteria may be applied to determine which devices are assigned to a port and when. In some embodiments, the scan pattern may have a plurality of segments. For each segment, a subset of the auto-connect devices may be selected, with the number of auto-connect devices in the subset matching the number of available ports. Queries may be sent during each segment to each of the auto-connect devices in the subset. The auto-connect devices selected to be in the subset may be permuted in each segment. The selection of devices may be made to balance numbers of queries sent to each auto-connect device. Though, in some embodiments, priorities may be associated with the auto-connect devices such that the frequency of queries sent to auto-connect devices varies in proportion to the priorities of the devices.

Though, an auto-connection may be initiated in ways other than a scan by a wireless device. Forming an auto-connection may be initiated by a remote device designated as an auto-connect device. In some embodiments, a remote device may scan for a wireless device for which it has been designated an auto-connect device. When the remote device detects the wireless device, it may initiate a connection, which may be completed by the wireless device automatically based on a prior designation of the remote device as an auto-connect device.

A remote device may be configured to scan for a wireless device based on parameters passed to the remote device during an initial device pairing. These parameters may be passed selectively, based on characteristics of the remote device. For example, whether the remote device is operating on AC power or battery power may determine whether the wireless device delegates the scanning task to the remote device, such that the scanning task is only delegated to remote devices that will not deplete their batteries by scanning.

Moreover, the task of triggering an auto-connection may be delegated to an intermediary device. In some embodiments, an intermediary device that is likely to be in an environment where a wireless device may encounter a remote device that is an auto-connect device may scan for either or both of the wireless device and the auto-connect device. In response to finding either or both of the devices, the intermediary device may communicate to either or both of the devices an indication that triggers the devices to automatically connect. As an example, the intermediary device may be a display with a controller and wireless interface card. The display may be powered from an AC source and may scan for a computing device and a human interface device, such as a wireless mouse. Upon detecting both, the display may send a message to the computer containing information to trigger the computer to initiate an auto-connect with the mouse.

A wireless device may configure an intermediary device for triggering auto-connect. In some embodiments, wireless devices may register their auto-connect devices with the intermediary device. The intermediary device may then scan for those auto-connect devices. Upon detecting such a device, the intermediary device may send a message to the wireless device, which triggers the wireless device to connect to the auto-connect device.

The message may be in any suitable format. The message may identify the detected auto-connect device or provide other information to facilitate the wireless device making a connection with the auto-connect device. In some embodiments, the message may be formatted as a Wake on LAN packet such that the computing device may be in a low power state prior to forming the connection.

The foregoing is a non-limiting summary of the invention, which is defined by the attached claims. It should be appreciated that the foregoing techniques may be used together, singly or in any suitable combination.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5A is a plot illustrating an exemplary scan pattern;

FIG. 5B is a sketch illustrating an alternative embodiment of a scan pattern during which two ports are used to scan for multiple auto-connect devices;

FIG. 5C is a sketch of an alternative scan pattern during which a single port is used to scan for multiple auto-connect devices;

FIG. 5D is a sketch of a further alternative scan pattern during which multiple ports are used to scan for multiple auto-connect devices;

DETAILED DESCRIPTION

Figure 1A:
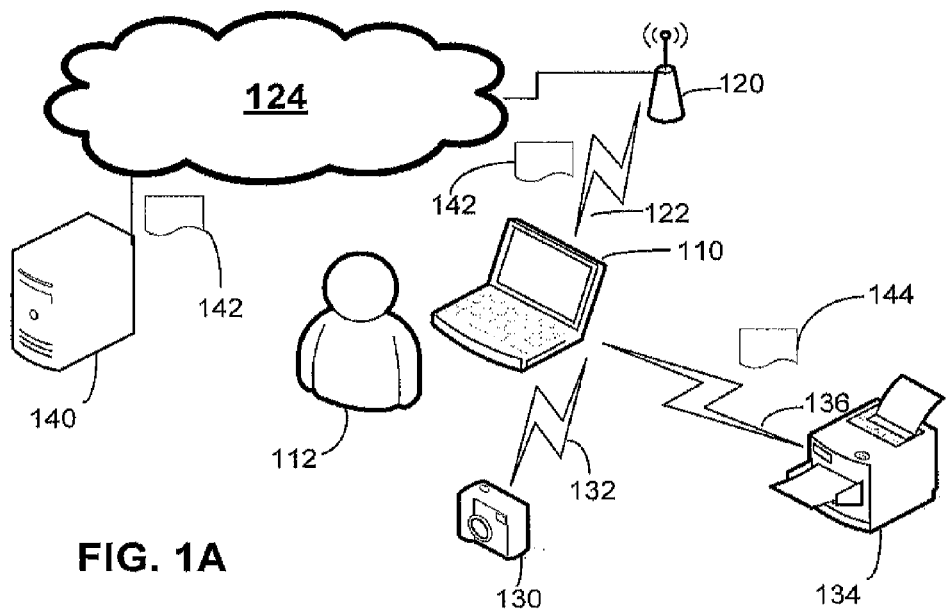
FIG. 1A is a sketch of an exemplary system in which a wireless device automatically connects with an auto-connect device.

The Inventors have recognized and appreciated that operation of wireless devices would be more useful to users of those wireless devices if devices established certain peer-to-peer groups automatically, rather than in response to express user input. Accordingly, for a wireless device, some remote devices may be designated as auto-connect devices. Upon determining that an auto-connect device is in vicinity, the wireless device may form a connection with these devices automatically.

Multiple aspects of forming such auto-connections are described herein. Those aspects include determining, for a wireless device, which remote devices are auto-connect devices. A further aspect is a mechanism by which a wireless device and a remote auto-connect device can be aware of each other when in close enough proximity that an auto-connection should be formed. These techniques may be used together, separately, or in any suitable combination.

Any of a number of techniques may be used to identify devices for auto-connect. Auto-connect devices, for example, may be designated by user input. Such input may be expressly entered through a user interface, with the input identifying a device. Alternatively, such input may be provided indirectly, such as by a user operating the computing device to download configuration information or to execute a configuration program.

Information identifying an auto-connect device may be in any suitable form. The information, for example, may identify a specific device, such as by specifying a MAC address or other identifier unique to a device. Though, auto-connect devices may be identified based on device type, functionality or other characteristics of the device or the environment in which the device is available for a connection.

Any of a number of techniques may be used to enable a wireless device to determine that a remote device designated as an auto-connect device is operating in its vicinity. These techniques may entail a device sending queries intended to identify either or both of a wireless device and a device designated as an auto-connect for that wireless device.

These queries may be formatted in any suitable way. For example, the queries may be formatted in accordance with a peer-to-peer protocol. Each query may solicit a response, in accordance with such a protocol, from any device that receives the query. Such a response may include information that enables a device sending such a query to identify whether a device responding to the query has been designated as an auto-connect device. Though, in some embodiments, the query may solicit responses from only certain types of devices. Such a query, for example, may include an information element or other suitable indication that the sender of such a query is seeking responses from human interface devices or devices of some other specified type, functionality or other characteristics. In yet further embodiments, a query may be directed to a specific device. Such a query may include an identifier of that specific device. The specific technique or techniques used to enable a wireless device to determine that an auto-connect device is in its vicinity may be selected based on power considerations. Both a pattern with which queries are sent and the device that sends the queries may be selected or influenced based on power considerations. A device may be selected to send queries to scan for an auto-connect device because it is powered from an AC power source or other power source that is not susceptible of being easily drained, like a battery might be if used to power extensive scanning for a remote device. The device selected may be the auto-connect device itself or the wireless device that will form an auto-connection with the auto-connect device. In some embodiments a sequence of queries may be transmitted such that a connection may be formed to an auto-connect device that misses a single query. A sequence may intermix queries to different auto-connect devices such that a wireless device for which multiple auto-connect device have been designated may detect when any of the auto-connect devices is in its vicinity. The sequence of queries may be sent in accordance with a scan pattern that defines both the timing with which queries are sent and the device or devices to which each query is directed.

Alternatively or additionally, an intermediary device may be selected to scan for either or both of the auto-connect device and/or the wireless device that will connect to it. Upon detection of a remote device designated for auto-connection to the wireless device, the intermediary device may signal either or both the wireless device and the remote device. A device receiving a signal from an intermediary device may then attempt to re-form a peer-to-peer connection with the other device.

The forgoing techniques may be used alone or together in any suitable combination in any suitable environment. FIG. 1A illustrates an environment in which a computing device communicates at a first time according to some embodiments.

In the example of FIG. 1A, computing device 110 is illustrated as a laptop computer. Though, it should be appreciated that the form factor of computing device 110 is not a limitation on the invention. Computing devices configured as tablets, SmartPhones or with any other suitable form factor may be configured and operated according to embodiments of the invention. Moreover, it should be appreciated that any wireless device may play any role in a peer-to-peer group. Accordingly, it is not a requirement that any of the devices in the group be a computing device.

FIG. 1A illustrates that computing device 110 is being operated by user 112. User 112 may interact with computing device 110 using techniques as are known in the art to control computing device 110 to wirelessly connect with other devices. However, in some embodiments, the devices may form peer-to-peer connections without an express user command to form such a connection. In this way, a user operating computing device 110 may, when the user goes to perform an operation involving communication with a remote device that has been designated as an auto-connect device, perform that operation without delay caused by computing device 110 forming that connection.

FIG. 1A illustrates exemplary peer-to-peer wireless connections. Computing device 110 is shown to have already formed connections 132 and 136 to camera 130 and printer 134, respectively. In this case, camera 130 and printer 134 are examples of wireless devices with which computing device 110 may connect in order to exchange data with these devices. Either or both of these devices may have been designated auto-connect devices such that either or both of connections 132 and 136 were formed without an express user command.

Camera 130, printer 134 and computing device 110 may communicate over wireless connections 132 and 136 using a peer-to-peer protocol that supports auto-connection. In this example, camera 130, printer 134 and computing device 110 may form a persistent group according to that peer-to-peer protocol. Though, in alternative embodiments, computing device 110 may form a first group with camera 130 and a second group with printer 134. Accordingly, it should be appreciated that a group may be made up of any suitable number of devices, including only two devices.

Wireless connections 132 and 136 may be formed according to any suitable peer-to-peer protocol. In this example, connections 132 and 136 are formed using an extension of the Wi-Fi protocol, referred to as Wi-Fi Direct, that has been augmented to support auto-connection.

In this example, computing device 110 also has a wireless connection through access point 120 to network 124. Wireless connection 122 through access point 120 is an example of an infrastructure type connection. Any suitable technique may be used to form wireless connection 122, including techniques that employ known infrastructure type protocols. As one example, wireless connection 122 may be formed using a protocol sometimes called "Wi-Fi." Though, the specific protocol used is not critical to the invention.

In the example illustrated, computing device 110 has the role of a station in wireless connection 122. The role of the computing device 110 indicates the specific steps of the wireless protocol performed by computing device 110 in order to exchange information with access point 120.

Network 124 may be a home network, an enterprise network, the Internet or any other suitable network. However, in the embodiment illustrated, network 124 may be the Internet, allowing computing device 110 to access computing devices, such as server 140, from anywhere in the world the Internet can be accessed.

Here, server 140 represents a server that can provide information about the auto-connect status of devices. In this example, server 140 may provide information 142 through network 124 to computing device 110. Information 142, for example, may relate to one or more of the remote devices in the vicinity of computing device 110. As a specific example, information 142 may relate to printer 134. This information may define the capabilities of printer 134, including its status as an auto-connect device. In this example, computing device 110 may request information 142 based on an identifier of printer 134 received in a transmission made by printer 134. Regardless of how computing device 110 requests information about a remote device, computing device 110 may use information 142 to determine whether a connection should automatically be formed with printer 134.

Though, it should be recognized that computing device 110 may obtain information concerning remote devices from any suitable external source. In some embodiments, computing device 110 may obtain information from the remote devices themselves. Accordingly, FIG. 1A illustrates that computing device 110 alternatively or additionally may receive information 144 from printer 134. Information 142 or 144 may be provided to computing device 110 at any suitable time. The information, for example, may be provided to computing device 110 after it has scanned and detected printer 134. Alternatively or additionally, information 142 or 144 may be provided to computing device 110 as part of initially pairing with the remote device, such as printer 134. As another example, printer 134 may periodically broadcast information 144 such that computing device 110 may obtain information 144 by monitoring for transmissions from nearby wireless devices.

Furthermore, it is not a requirement that information indicating the auto-connect status of remote devices be obtained over a network. As shown in FIG. 1A, computing device 110 has a user interface. In this example, the user interface is provided by a keyboard and display. User 112 may enter information through this user interface to designate one or more devices as auto-connect devices. This information may subsequently be used during the operation of computing device 110 to automatically form connections with devices based on their auto-connect status. When computing device 110 determines that it is in the vicinity of a remote device designated as an auto-connect device, it may automatically form a connection with that device, without a user command.

Information 142 and/or 144 may be in any suitable form. It may directly indicate that a specific remote device should be regarded as an auto-connect device. This specification may be made by any suitable party. As one example, the manufacturer of the remote device may provide an information file associated with the device. As part of that information file, the device manufacturer may indicate that the device has properties that make an auto-connection desirable for users. However, device information may be specified by other suitable sources. For example, a network administrator may create a device profile that includes a designation of the auto-connect status of the device. Such a device profile may be stored on a server, such as server 140, from which wireless devices may download the device profile. Such an embodiment may be useful, for example, in an environment in which network 124 is an enterprise network and server 140 is controlled by the network administrator. Alternatively or additionally, such a device profile may be stored in memory on the remote device, such as printer 134, and provided to computing device 110 as part of a response to a beacon or other query communicated wirelessly by computing device 110.

Figure 1B:
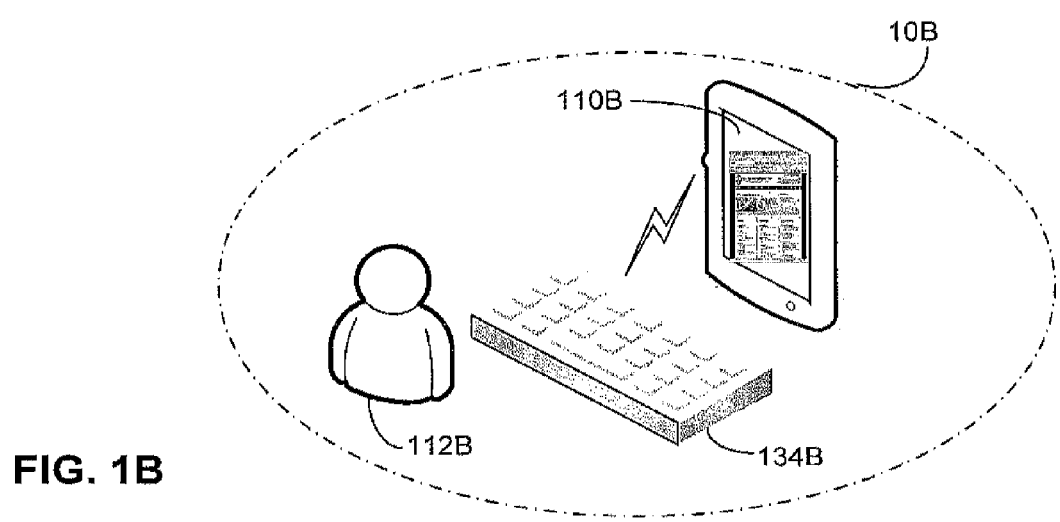
FIG. 1B is a sketch of an alternative embodiment of a system in which a wireless device automatically connects with an auto-connect device.

Though, it is not a requirement that information about the auto-connect status of a device be conveyed as part of a device profile or even expressly communicated. In some embodiments, a wireless device may determine the auto-connect status of a remote device based on information about the type, functionality or other characteristic of the remote device. FIG. 1B provides an example of such an embodiment. In the example of FIG. 1B, computing device 110B may identify a remote device as an auto-connect device based on the type of the remote device or functionality provided by that remote device. In the example of FIG. 1B, computing device 110B and keyboard 134B are located within area 10B. Accordingly, keyboard 134B is in proximity to computing device 110B and will receive a query if transmitted by computing device 110B. A response sent by keyboard 134B may reveal the type or functionality of the remote device. In this example, a response by keyboard 134B may indicate that keyboard 134B has a type associated with human interface devices. Alternatively or additionally, the response may indicate that keyboard 134B provides functionality of a keyboard. Computing device 110 may be programmed to automatically connect with devices of this type or functionality. Accordingly, based on the information about the type and/or functionality provided by keyboard 134B, computing device 110B may automatically form a peer-to-peer connection with keyboard 134B. In this way, when user 112B brings computing device 110B into area 10B containing keyboard 134B, user 112B will be able to use keyboard 134B to provide input to computing device 110B without expressly providing a command to cause computing device 110B to form a peer-to-peer connection with keyboard 134B.

As a further example of a way in which a wireless device may identify an auto-connect device, a wireless device may provide a user interface through which a user may designate devices as auto-connect devices. As with other techniques for designating a device as an auto-connect device, specific devices may be designated as auto-connect devices or devices may be designated as auto-connect devices by designating a type, functionality or other characteristic of auto-connect devices.

Figure 1C:
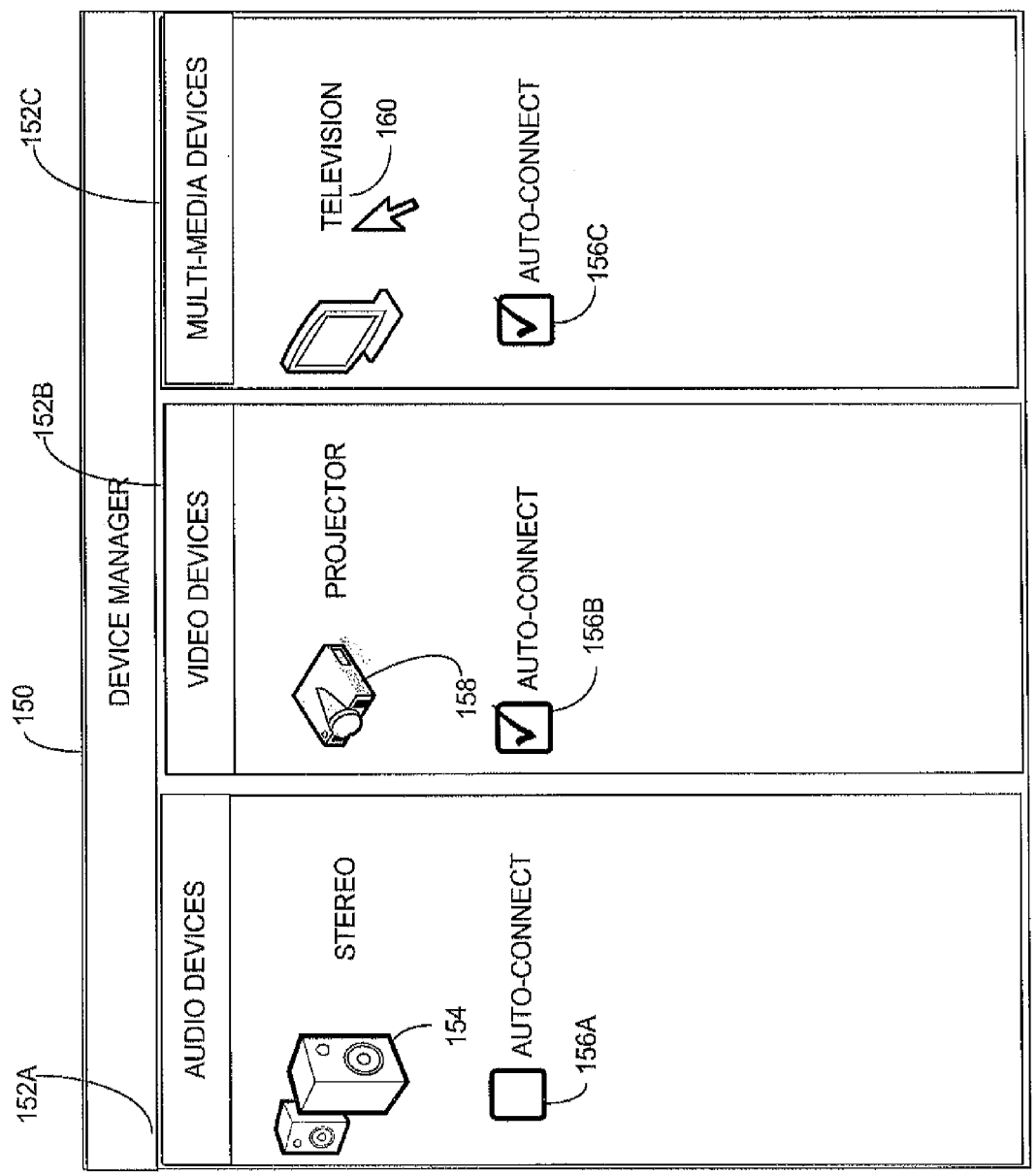
FIG. 1C is a sketch depicting a graphical user interface through which a user may designate one or more devices as auto-connect devices.

FIG. 1C illustrates a user interface through which a user may designate devices as auto-connect devices. In this example, specific devices are designated individually. Though, in other embodiments, a user interface may receive user input designating device types or functionality of devices designated as auto-connect devices.

User interface 150 is an example of a user interface that may be rendered by software executing on a wireless device, such as computing device 110 or 110B. In this example, the user interface 150 is rendered by a device manager component within an operating system. Though, the specific component within a computing device that renders a user interface is not critical to the invention. The user interface may be rendered by any suitable operating system component or, in some embodiments, by applications executing on the computing device.

In embodiments in which a device manager obtains designations of auto-connect devices, a device manager may be constructed using techniques as are known in the art. The device manager, for example, may maintain information about devices known to the computing device. These devices may represent devices that are in the vicinity of the computing device and respond to a query from the computing device. Alternatively or additionally, the devices known to the device manager may be devices to which the computing device has previously formed a connection. Though, it should be appreciated that the manner in which the device manager obtains information about remote devices is not critical to the invention and any suitable mechanism for discovering devices for presentation through a device manager may be used.

In the example of FIG. 1C, the device manager presents devices grouped by type. Accordingly, pane 152A is shown containing information about audio devices. Pane 152B is shown containing information about video devices and pane 152C is shown containing information about multimedia devices. Though, it should be appreciated that the categories of devices illustrated in FIG. 1C are illustrative only, and a user interface may be constructed with any usable number and type of categories.

In this example, pane 152A contains information 154 about an audio device. Pane 152B contains information 158 about a video device. Pane 152C contains information about a multimedia device. In this example, associated with information 154, 158 and 160 for each device is a control though which a user may designate the device associated with the displayed information as an auto-connect device. In this example, controls 156A, 156B and 156C are illustrated as check-box controls. As is known in the art, when a user operates a pointing device to select such a control, software coupled to the control will record the user's selection and change the appearance of the control. In the illustrated example, the user has not selected control 156A, such that the device associated with information 154 is not designated an auto-connect device. In contrast, controls 156B and 156C have a state indicating that they have been selected by the user, representing an indication that the devices associated with information 158 and 160 are to be treated as auto-connect devices.

The software coupled to the controls 156B and 156C may store the designation of devices as auto-connect devices in any suitable way. In some embodiments, this information may be stored in a persistent data store, such as may be stored in a non-volatile memory associated with the computing device. In this way, when other components of the computing device conditionally take action based on whether a device is an auto-connect device, those components may access data in the persistent data store to determine whether a specific device has been designated an auto-connect device.

Figure 1D:
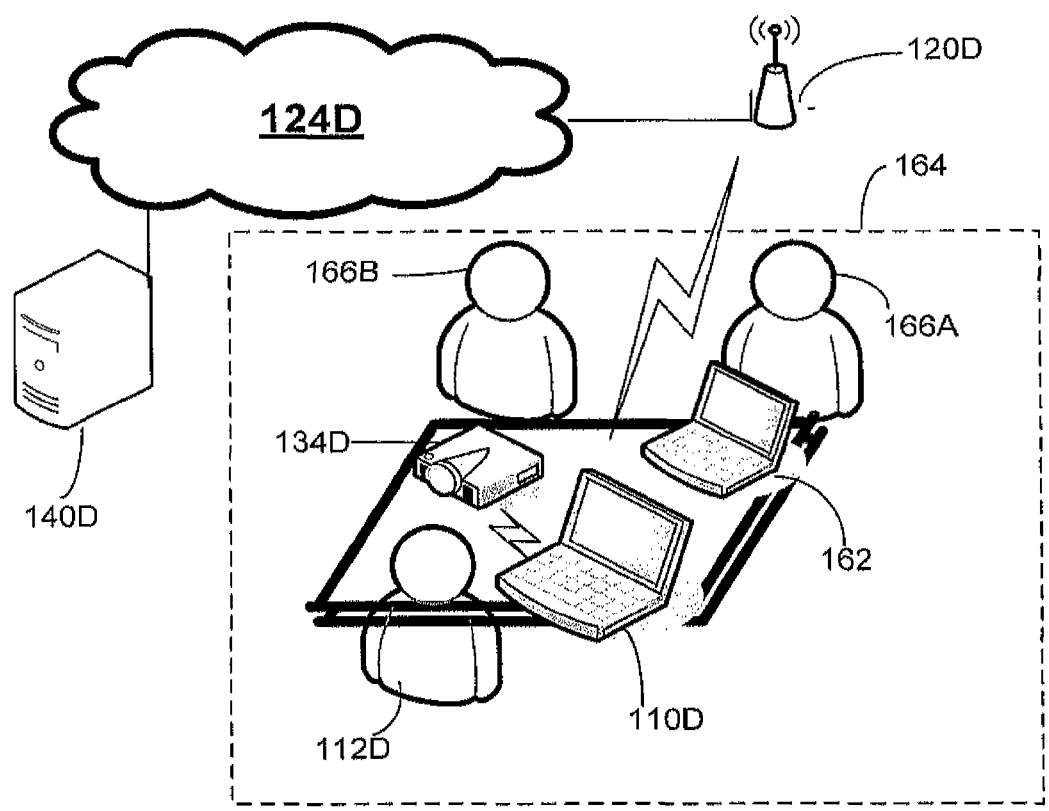
FIG. 1D is a sketch of a system in which a wireless device selectively forms a connection with an auto-connect device based on context.

It is not a requirement that a device be identified as an auto-connect device based on a specific designation, whether that designation is made by user input or by information conveyed to a wireless device from an external source. In some embodiments, a device may be determined to be an auto-connect device for a wireless computing device based on the context of the wireless device. FIG. 1D illustrates a scenario in which a computing device may identify a remote device as an auto-connect device based on context.

FIG. 1D illustrates a wireless device in an environment 164. Computing device 110D may be programmed to identify its environment in any suitable way. As an example, computing device 110D may identify its environment based on the types of devices from which it receives wireless communications. In the specific example illustrated in FIG. 1D, computing device 110D may receive communications from an access point 120D. Access point 120D may be coupled to an enterprise network 124D. Network 124D may incorporate a domain controller 140D or other server that indicates that network 124D is a managed network within an enterprise. In other settings, other characteristics may enable computing device 110D to identify different types of environments.

In this example, the wireless device is a computing device 110D operated via user 112D. The environment 164 may be a meeting room or other location in an enterprise setting. In operation, computing device 110 may broadcast a query, seeking responses that will allow computing device 110D to identify auto-connect devices within environment 164. However, rather than immediately forming a connection with any discovered auto-connect device, computing device 110D may conditionally form such a connection based on the environment 164. As a specific example, computing device 110D may differentiate between an environment representative of an enterprise setting, an environment representative of a public location and an environment representative of a small office or home setting. Computing device 110D may be programmed to take different actions, depending on the environment 164. The programmed actions may include, for example, automatically forming a peer-to-peer connection with a remote device that provides a function that is likely useful to the user in the detected environment. In this way, an auto-connection may be conditioned on the environment of the wireless device in combination with one or more other factors, such as a type, functionality or other characteristic of a detected device in that environment.

Environmental information or other context information may also be used to condition automatically forming a connection with a device that has been designated as an auto-connect device. For example, though projector 134D may be designated as an auto-connect device, computing device 110 may selectively connect automatically to that device based on the characteristics of environment 164. In the scenario in which computing device 110D is in an enterprise setting, projector 134D may be in a conference room shared by user 112D of computing device 110D and one or more other users, such as users 166A or 166B. User 166A, for example, may be operating another computing device, such as computing device 162 to project information through projector 134D. In this scenario, it may be undesirable for computing device 110D to automatically connect to projector 134D. Accordingly, when the environment 164 is characterized by components associated with an enterprise setting, computing device 110D may forego an automatic connection to projector 134D, even if projector 134D has been designated as an auto-connect device.

Though, computing device 110D may be programmed to automatically form a connection to a device such as projector 134D in other settings. For example, in a small office or home setting, the likelihood of another user accessing projector 134D may be sufficiently small that an auto-connection to projector 134D is consistent with the user's expectations in that environment. Accordingly, computing device 110D may be programmed to automatically connect to projector 134D when in a small office or home environment, even if computing device 110D does not automatically connect in other settings.

Figure 1E:
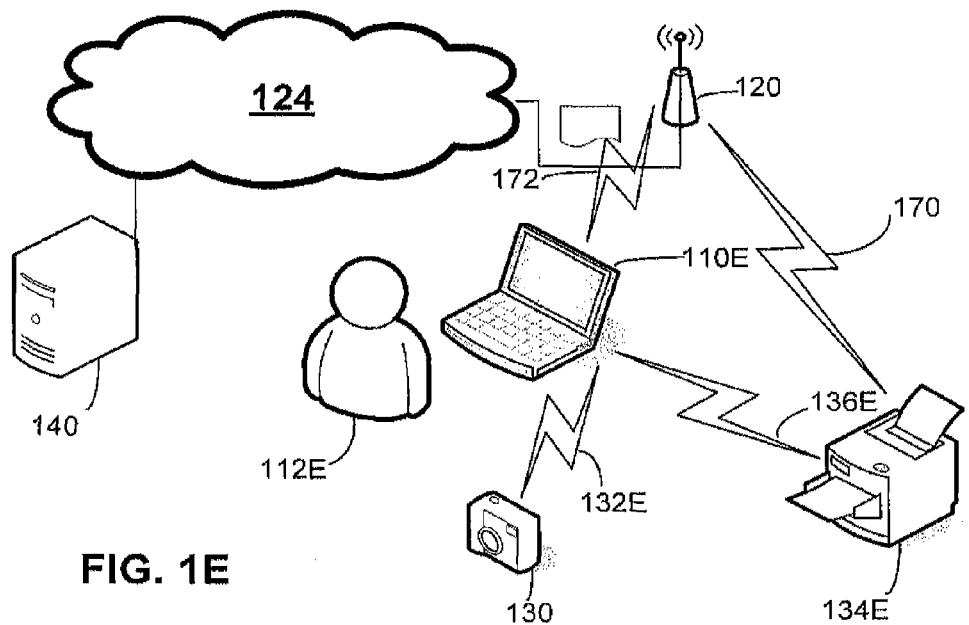
FIG. 1E is a sketch of a system in which a wireless device is alerted to the presence of an auto-connect device based on information routed through an access point.

A wireless device may employ any suitable technique to determine whether any remote devices that have been designated as auto-connect devices are in the vicinity of the wireless device. In some embodiments, a wireless device may broadcast queries to which remote devices may respond. In other embodiments, a wireless device may receive an indication from an external source that an auto-connect device may be in its vicinity. In this way, a wireless device may be triggered to initiate a connection with the remote device that has been designated as an auto-connect device. In some embodiments, a wireless device may detect an auto-connect device in its vicinity based on a message sent by the auto-connect device, itself. In the scenario illustrated in FIG. 1E, computing device 110E may receive a message initiated by printer 134E. In some embodiments, the message may be sent directly from the remote device to the wireless device. Though, in the illustrated example, the message may be relayed through an intermediary device, such as through access point 120.

As illustrated, printer 134E sends a message 170 through access point 120, which is relayed as message 172. Message 172 may identify printer 134E. When both printer 134E and computing device 110E are close enough to access point 120 to both communicate through access point 120, computing device 110E and printer 134E may be in sufficiently close proximity to form peer-to-peer connection 136E. Accordingly, receiving message 172 may act as a trigger for computing device 110E to automatically form a connection 136E. In this way, user 112E may operate computing device 110E to print without ever expressly entering a command for computing device 110E to connect to printer 134E. Rather, when user 112E enters a command into computing device 110 to print, computing device 110E may send information for printing over connection 136E that was previously automatically formed such that user 112E may print without delays associated with discovering and initiating a peer-to-peer connection with printer 134E.

Printer 134E may be configured in any suitable way to transmit message 170 to make its presence in the vicinity of access point 120 known. Printer 134E may be programmed by its manufacturer to transmit a message 170. Alternatively, printer 134E may be configured by a network administrator to transmit message 170. In these cases, message 170 may announce the presence and availability of printer 134 for a connection with any computing device. In other scenarios, printer 134E may be configured to announce availability for auto-connection with specific computing devices.

In some embodiments, for example, message 170 may indicate specific devices for which printer 134E has been designated as an auto-connect device. Specific devices may be indicated in message 170, for example, by an address inserted in message 170. Message 170, for example, may be a unicast address in accordance with a wireless protocol, such as the Wi-Fi protocol, with a unicast address identifying computing device 110E or other device for which printer 134E has been designated as an auto-connect device. Though, other forms of addressing are possible. For example, message 170 may contain a multicast address, identifying multiple wireless devices for which printer 134E has been designated as an auto-connect device. As yet a further alternative, message 170 may contain a broadcast address. In this scenario, message 170 may contain one or more information elements allowing a wireless device that receives the message to determine whether an auto-connection should be formed with a remote device in its vicinity. If such a broadcast message is sent, in some embodiments, the broadcast message may identify devices for which printer 134E has been designated an auto-connect device. Though, in other embodiments, such a broadcast message may simply identify that printer 134E is available for auto-connection and any device receiving such a message may be programmed to determine whether it should form an auto-connection.

In embodiments in which the message is directed to a specific computing device, any suitable message format may be used. In some embodiments, a message, such as message 172, may be formatted as a Wake on LAN message. Such a message may have a format as is known in the art. Upon receipt of such a message, a computing device may perform one or more pre-programmed actions. Those actions may be performed even if the computing device was operating in a low power state when the message was received. Computing devices responding to Wake on LAN packets may be configured such that, even if hardware components of the computing device are operating in a low power state when the Wake on LAN message is received, those hardware components will convert to a full power operating state, enabling the computing device to respond to the command associated with the Wake on LAN message. In this way, even if computing device 110E is in a low power state when it is brought into the vicinity of printer 134E, computing device 110E may receive message 172, and if appropriate, form a connection automatically with printer 134E.

Printer 134E may obtain information about the devices for which it has been designated an auto-connect device in any suitable way. In some embodiments, once devices form an initial pairing, one device may communicate to the other that it has been designated as an auto-connect device. For example, at a first time computing device 110E may pair with printer 134E. This pairing at the first time may be performed based on user input or other criteria. As part of this pairing, computer device 110E may communicate to printer 134E that printer 134E has been designated as an auto-connect device. Though, the mechanism by which a remote device receives a designation that it is an auto-connect device for a wireless device is not critical to the invention. As another example, following user input through a user interface, such as user interface 150 (FIG. 1C), a device manager or other component rendering user interface 150 may communicate with each device designated as an auto-connect device. Regardless of how printer 134E is designated as an auto-connect device, thereafter, printer 134E may send messages, either directly or indirectly to computing device 110E.

Figure 1F:
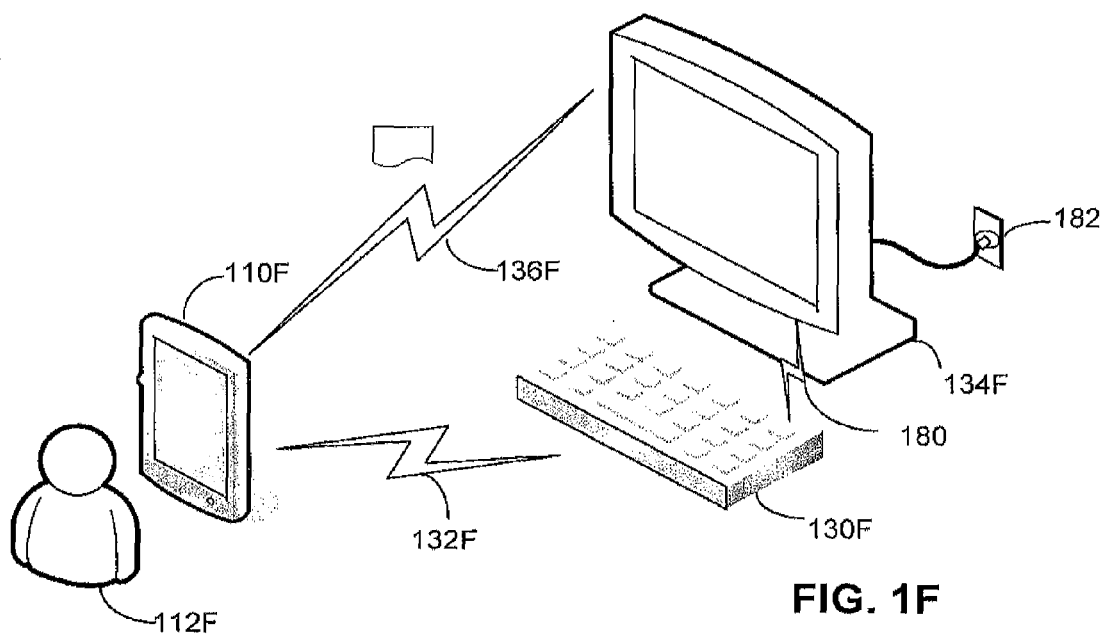
FIG. 1F is a sketch of a system in which a wireless device is alerted to the proximity of an auto-connect device based on information provided by an intermediary device.

Turning to FIG. 1F a further scenario is illustrated in which a wireless device receives an indication that a designated auto-connect device is in its vicinity. In the scenario illustrated in FIG. 1F, a remote device operates as a proxy for the wireless device and/or the remote auto-connect device. In this way, a proxy device may act as a broker connecting a wireless device with a device designated as an auto-connect device in a way that reduces battery drain on either or both of the wireless device and the auto-connect device.

In the scenario illustrated in FIG. 1F, a user 112F has brought a wireless device, illustrated as computing device 110F, into the vicinity of one or more other devices that may be designated as auto-connect devices. In this example, wireless keyboard 130F is one such remote device. Display 134F is also in the vicinity of keyboard 130F. These device may be used together to provide functionality of a work station to a user 112F of computing device 110F when in the vicinity of keyboard 130F and display 134F.

Display 134F may also be equipped with a radio and control components such that display 134F may also act as a wireless device. Accordingly, display 134F may also be designated as an auto-connect device.

In this example, display 134F is connected to a source 182 of AC power. Unlike keyboard 130F and computing device 110F, display 134F need not operate on battery power, which could be depleted by frequent scanning for nearby devices in order to form an automatic connection.

One mode of operation of the components illustrated in FIG. 1F may be for computing device 110F to delegate to display 134F the task of periodically transmitting wirelessly to allow computing device 110F and display 134F to discover that those devices are in the vicinity of each other. As a specific example, at a first time, a computing device 110F may discover and pair with display 134F. As part of that pairing, computing device 110F may communicate a command to display 134F indicating that display 134F should transmit wireless communications formatted to alert computing device 110F that it is in the vicinity of display 134F whenever such a communication is received. Such communications, for example, may be formatted as probe action frames in accordance with a peer-to-peer protocol. Though, the specific format of such messages is not critical to the invention.

In some embodiments, computing device 110F could similarly pair with keyboard 130F and delegate the task of establishing communication to keyboard 130F. However, in this scenario, keyboard 130F is an example of a battery operated device. Requiring a battery operated device to perform the task of scanning so that computing device 110F can determine that it is in proximity with keyboard 130F may deplete the battery for keyboard 130F. Conversely, requiring computing device 110F to scan to discover that keyboard 130F is in proximity may be deplete the battery of computing device 110F. Accordingly, an alternative mode of operation of the devices illustrated in FIG. 1F is to enable display 134F to act as a proxy for either keyboard 130F or computing device 110F. If acting as a proxy for computing device 110F, display 134F, upon detecting computing 110F in its vicinity, may transmit a message 180 reporting on the presence of computing device 110F. Keyboard 130F may receive message 180. If keyboard 130F has been designated as an auto-connect device for computing device 110F, or vice-versa, message 180 may signify to keyboard 130F to initiate a connection 132F with computing device 110F.

Though, it is not a requirement that connection 132F between computing device 110F and keyboard 130F be initiated by keyboard 130F. Display 134F for example, may detect keyboard 130F in its vicinity and, upon detection of computing device 110F also in its vicinity, may report to computing device 110F the presence of keyboard 130F. As a result of such a communication between display 134F and computing device 110F, computing device 110F may initiate connection 132F.

In the scenario illustrated in FIG. 1, both the remote device acting as the proxy, in this example, display 134F, and the remote device operating as the proxied device, in this example, keyboard 130F, may be designated as auto-connect devices for the wireless device, computing device 110F in this example, in any suitable way. In some embodiments, the remote devices may be identified as auto-connect devices based on their type, functionality or other characteristics. Alternatively, the remote devices may be designated as auto-connect devices as part of an initial pairing between the wireless device and the remote devices. However, the specific mechanism by which the remote devices are identified as auto-connect devices is not critical to the invention.

The mechanism by which the proxy device identifies a proxied device about which it is to supply information to a wireless device also is not critical to the invention. For example, a proxy device may transmit messages reporting on the presence of any other wireless devices in its vicinity. The proxy device, for example, may broadcast messages requesting wireless devices in its vicinity to supply information that may be used in determining whether to automatically form a connection to the device. Such information from a proxied device may include characteristics of the device such as a type or functionality. Alternatively or additionally, such information from a proxied device may include an identifier of the device and/or an identifier of another device for which the proxied device has been designated as an auto-connect device. In some embodiments, the proxy device may simply re-transmit on a repeated basis the information received from any proxied devices in its vicinity.

Though, other mechanisms may alternatively or additionally be used by the proxied device when determining what information to obtain and forward about a proxy device. In some embodiments, for example, wireless devices may register with the proxy device. For example, at a time when computing device 110F has paired with display 134F, computing device 110F may transmit over connection 136F registration information.

Information supplied as part of registration may include information about the wireless device and/or information about devices designated as auto-connect devices for the wireless device. For example, the registration information may include an identifier of the wireless device seeking information about devices that may be auto-connect devices for it. In some embodiments, the registration information may identify, either with specific device identifiers or by device characteristics, auto-connect devices for the wireless device.

As a specific example, as part of a registration process, computing device 110F may transmit to display 134 in its role as a proxy an identifier for keyboard 130F. Computing device 110F may obtain such information from having previously paired with keyboard 130F. Based on this information, display 134F may store, possibly in its persistent device store or other non-volatile memory, information linking wireless computing device 110F and wireless keyboard 130F.

Display 134, acting as a proxy, may use this information in any suitable way. For example, upon detecting the presence of computing device 110F, display 134 may send wireless communications to scan for wireless keyboard 130F and any other remote devices identified as auto-connect devices for computing device 110F. Alternatively, display 134F, in its role as a proxy, may continuously scan for any of the auto-connect devices that have been registered with it. For example, display 134F may scan for keyboard 130F even prior to detecting computing device 110F. Upon detecting computing device 110F, display 134F may wirelessly transmit a report, based on previously stored information about the presence of keyboard 130F, that keyboard 130F, or any other designated auto-connect devices for computing device 110F, are in proximity to computing device 110F. Accordingly, it should be appreciated that use of a proxy device provides flexibility in the way that a wireless device may detect the presence of one or more remote devices that have been designated as auto-connect devices for the wireless device. When the proxy device is powered from an AC source, these techniques may entail scanning for devices such that the wireless device and remote device designated as an auto-connect device may determine that they are in close proximity, without draining battery power from any of the devices.

Figure 2:
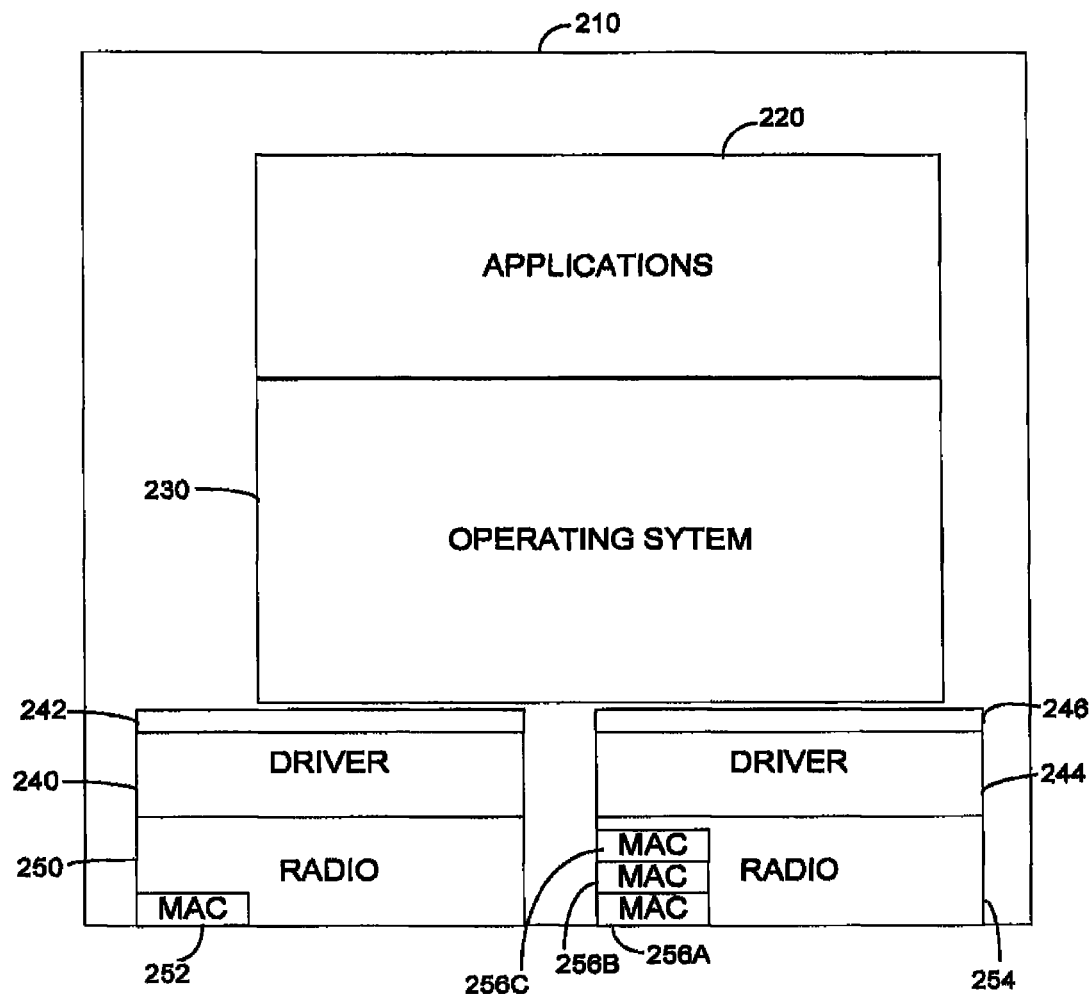
FIG. 2 is a high level block diagram of an exemplary computing device adapted for wireless communication.

Wireless devices operating according to a peer-to-peer wireless protocol, adapted to include any of the function described herein, may be implemented in any suitable way. An exemplary embodiment is provided in FIG. 2. FIG. 2 illustrates, at a high level, an architecture for computing device 210 that may be operated to form an infrastructure mode wireless connection, such as wireless connection 122 (FIGS. 1A and 1B) and peer-to-peer wireless connections, such as connections 132 and 136 (FIGS. 1A and 1B). In the example of FIG. 2, computing device 210 includes two radios, radio 250 and radio 254. Each of the radios may be adapted to send and receive wireless communications. Radio 250, for example, may be used to form wireless connection 122. Radio 254, for example, may be used to form peer-to-peer connections 132 and 136.

In this example, radio 250 has a media access control (MAC) address 252. The MAC address may be a unique identifier associated with radio 250 such that it may be used to distinguish radio 250 from radio 254 and also from radios in any other devices with which computing device 210 may communicate. Accordingly, the MAC address 252 may be included in packets sent by radio 250 to indicate that the frame was sent by radio 250 or may be included in packets directed to radio 250 to indicate that a frame is intended for radio 250.

MAC address 252 may be assigned to radio 250 in any suitable way. It maybe assigned, for example, by the manufacturer of radio 250. Though, in some embodiments, MAC address 252 may be assigned by operating system 230 or another component of computing device 210 or by some other component in a system in which computing device 210 is operating.

Radio 250 may be controlled through software, represented as driver 240 in FIG. 2. Here, driver 240 includes an interface 242 through which operating system 230 may issue commands to driver 240 and through which driver 240 may report status and notify operating system 230 of received data. Interface 242 may be implemented in any suitable way, including according to a known standard. An example of such a known standard is called NDIS, but that standard is not critical to the invention.

Interface 242 may support a number of commands in a format that does not depend on the construction of radio 250. Rather, driver 240 may translate the commands, in the standardized format of interface 242, into specific control signals that are applied to radio 250. Additionally, driver 240 may be programmed to perform certain low level functions associated with a wireless connection. For example, upon receipt of a packet, driver 240 may check that the packet is properly formatted. If the packet is properly formatted, driver 240 may control radio 250 to generate an acknowledgement. Conversely, if the packet is not properly formatted, driver 240 may control radio 250 to transmit a negative acknowledgement.

Though driver 240, and in some instances radio 250, may automatically perform low level functions associated with establishing and maintaining a wireless connection, higher level functions may be performed under control of operating system 230 or applications 220. In some embodiments, an application 220 or operating system 230 may provide a user interface such that ultimate control of wireless communication is provided by a user of computing device 210.

In the embodiment illustrated in FIG. 2, computing device 210 also includes a radio 254. While radio 250 may be used, for example, for a connection to an infrastructure network, radio 254 may be used to form one or more peer-to-peer connections, such as connections 132 and 136.

Radio 254 is incorporated into computing device 210 with generally the same architecture as radio 250. Radio 254 is associated with a driver 244 that provides a mechanism for operating system 230 to control radio 254. Driver 244 has an interface 246 through which operating system 230 may send commands to driver 244 and driver 244 may provide status to operating system 230. Interface 246, like interface 242, may be a standardized interface such that operating system 230 may communicate with driver 244 using a similar set of commands as are used to control driver 240. Though, because radio 254 is used to implement peer-to-peer connections, driver 244 may respond to different or additional commands than driver 240 in order to implement functions associated with peer-to-peer communications that do not exist for infrastructure based communications.

As an additional difference between radios 250 and 254, radio 254 is illustrated as having multiple MAC addresses. In contrast, radio 250 includes a single MAC address 252. Here, MAC addresses 256A, 256B and 256C are illustrated. Multiple MAC addresses, for example, may be assigned by a manufacturer of radio 254 or the MAC addresses may be assigned in any suitable way, including as described above in connection MAC address 252. Alternatively, one or more of the MAC addresses may be assigned based on an identifier of the user of computing device 210.

Having multiple MAC addresses allows radio 254 to appear to devices external to computing device 210 as multiple entities, each with a separate MAC address. As an example, if computing device 210 is separately communicating as a group owner in a first peer-to-peer group and as a client in a second peer-to-peer group, separate entities may be established for the group owner and the client. Devices external to computing device 210 may address packets intended to be processed by computing device 210 as a group owner in the first group with a first MAC address. Packets intended to be processed as a client in the second group may be addressed with a second MAC address. Similarly, computing device 210 may insert the first MAC address in packets coming from the group owner; packets from the client may include the second MAC address.

To allow operating system 230 to associate its interactions with driver 244 with a specific one of those entities, internal to computing device 210, each of the entities may be represented as a port. Accordingly, operating system 230 may send commands to or receive status information from each such entity through a port associated with that entity.

Each of the ports may be configured to perform functions appropriate for the type of entity the port represents. An embodiment in which computing device 210 operates according to a Wi-Fi Direct, which is used herein as an example of a peer-to-peer protocol, a device that is part of a peer-to-peer group may take on a role of a group owner or a client. A group owner may be required in accordance with a wireless protocol to send certain types of action frames and respond to other types of action frames in specified ways. A device configured as a client may send different action frames and responses or may send the same action frames and responses in different contexts.

Though, it should be appreciated that a group owner and a client are just two examples of the roles that radio 254 and driver 244 may be configured to perform. As another example, an entity may be configured as neither a group owner nor a client. Rather, an entity may be assigned a role as a controller that manages interactions with other devices to form a group and determine the role of computing device 210 in that group.

Though FIG. 2 illustrates separate radios, radio 250 and radio 254, in embodiments in which infrastructure connections and peer-to-peer communications operate using the same frequency channels, a single radio may be used. In such an embodiment, entities performing roles associated with infrastructure communication and entities performing roles associated with peer-to-peer communications may be implemented with the same radio.

Figure 3:
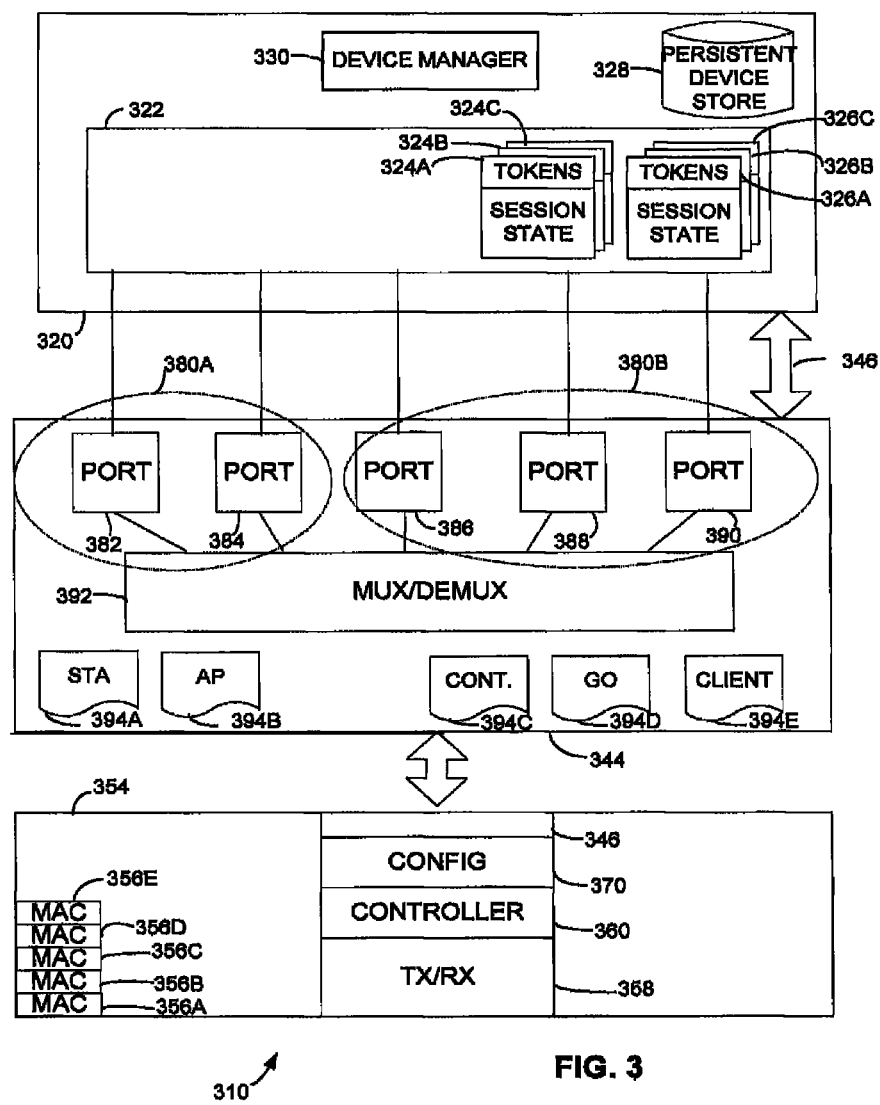
FIG. 3 is a more detailed block diagram of an exemplary computing device adapted for wireless communications.

FIG. 3 illustrates an embodiment in which a computing device 310 is configured to support, using a single radio, both entities that have a role in an infrastructure network and entities that have a role for peer-to-peer communication. FIG. 3 illustrates computing device 310 containing a radio 354. Radio 354 is illustrated as having multiple MAC addresses, illustrated as MAC addresses 356A, 356B, 356C, 356D and 356E. Though five MAC addresses are illustrated, which may allow radio 354 and its associated driver 344 to concurrently provide five ports, it should be appreciated that the specific number of MAC addresses supported is not critical to the invention and more or less than five MAC addresses may be used in some embodiments.

In this example, the five MAC addresses may be used to provide five ports 382, 384, 386, 388 and 390, each configured to perform a different role. In the scenario illustrated, a group 380A of these ports has been configured to implement entities used for infrastructure based communications. Group 380B contains ports configured for peer-to-peer communications.

In the example illustrated in FIG. 3, group 380A contains two ports, ports 382 and 384. Group 380B is shown containing three ports, ports 386, 388 and 390. It should be appreciated that the number of ports allocated for each type of use is not critical to the invention and any suitable number may be used. Moreover, it is not a requirement that the number of ports in each group remain static. Rather, operating system 320 may issue commands to driver 344 to dynamically create or break down ports as needed.

In conjunction with a command to create a port, operating system 320 may specify a role associated with that port. Driver 344 may respond to such a command by creating a port configured for a designated role, which may be associated with infrastructure-based communications or with peer-to-peer communications. Though operating system 230 may specify a role, the role specified may be determined in any suitable way. For example, when forming a peer-to-peer group, operating system 320 may determine the role by controlling computing device 310 to wirelessly exchange messages with other devices in the group to collectively negotiate a role for each device.

Though any suitable mechanism may be used to implement a capability to assign a role to computing device 310, FIG. 3 illustrates an interface 346 between operating system 320 and driver 344. Interface 346 may be an interface to a driver in a standardized format. As one example, some drivers are written in accordance with the NDIS interface specification. In accordance with that specification, commands and status information may be exchanged between driver 344 and operating system 320 using programming objects called OIDs. The NDIS standard defines a number of OIDs that drivers should or may respond to. The standard, though, is extensible such that OIDs may be defined to support additional functionality in certain circumstances. This extensibility may be used to define commands, using OIDs or other suitable representation, that allows operating system 320 to command driver 344 to create or break down a port or to configure a port for a specific role.

Though radio 354 can process packets for multiple ports, other than supporting multiple MAC addresses, radio 354, in some embodiments, need not be specially configured for supporting ports. Radio 354 may be implemented using techniques as are known in the art. In this example, transmitter/receiver section 358 may be a hardware component as is known in the art and used for wireless communications. In this example in which radio 354 is being used to support communications in accordance with the Wi-Fi infrastructure-mode protocol and the Wi-Fi direct protocol for peer-to-peer communications, transmitter/receiver section 358 may support communications in multiple subchannels over a frequency range defined by the Wi-Fi specification. Though, the specific operating characteristics of transmitter/receiver section 358 may vary depending on the specific protocol implemented for communication and are not critical to the invention. Likewise, controller 360 may be a hardware component as is known in the art of wireless radio design. Similarly, configuration register 370 may be a hardware component as is known in the art of wireless radio design. The components indicated as MAC address 356A . . . 356E may also be implemented using techniques as are known in the art. In some embodiments, the MAC addresses supported by radio 354 may be encoded in a read only memory or other component that is a portion of radio 354. It should be appreciated that, in embodiments in which MAC addresses are assigned to radio 354 through driver 344, MAC addresses 356A . . . 356E may be physically implemented in either volatile or non-volatile rewriteable memory such that the pool of MAC addresses to which radio 354 can respond may be dynamically created.

Regardless of the manner in which the components of radio 354 are implemented, radio 354 may contain a hardware interface 346 through which driver 344 may control radio 354. In some embodiments, driver 344 may be computer executable software instructions executing on a processor within computing device 310. Accordingly, hardware interface 346 may be implemented as a bus connection or other suitable interconnection between the processor executing driver 344 and a separate card holding radio 354. Though such hardware interfaces are known in the art, any suitable interface may be used.

To configure radio 354 to support a port, driver 344 may configure radio 354 to process packets for a specific MAC address associated with communications through that port. Driver 344 may write a value into configuration register 370 indicating that a MAC address should be activated such that radio 354 will process received packets identified with that MAC address. In operation, controller 360 may control transmitter/receiver section 358 to respond to any packets identified with a MAC address identified as active by information in configuration register 370. Accordingly, if multiple ports are active, configuration register 370 will contain an indication of each of the active MAC addresses.

In addition to configuring radio 354 to respond to a MAC address for a port, driver 344 may specify communications parameters to be used with that MAC address. These parameters may specify, for example, that a different number of subchannels may be used for communication with different MAC addresses. In this way, communication characteristics of different ports may be controlled based on the role associated with the port. As a specific example, a port configured as a control port may require lower bandwidth than a port for communicating data. Accordingly, radio 354 may be configured to use fewer subchannels or a different encoding scheme for a MAC address that is associated with a control port.

For information to be transmitted, driver 344 and/or radio 354 may be operated such that any frames transmitted containing such information will be identified by the MAC address associated with the port for which the information is being transmitted. Any suitable mechanism may be used to associate MAC addresses with specific frames sent from or received for a specific port. Moreover, this processing may be performed partially or totally within driver 344 and partially or totally within radio 354 because the specific implementation does not impact functioning of the ports.

To implement multiple ports, driver 344 may also be configured. In this example, driver 344 is illustrated to contain computer executable instructions that implement a multiplexer/demultiplexer 392. Multiplexer/demultiplexer 392 operates to route received packets associated with a port to a portion of driver 344 that implements the functionality of the respective port. Conversely, multiplexer/demultiplexer 392 receives packets for transmission from any of the ports and routes those packets to radio 354.

In scenarios in which multiple ports simultaneously have information for transmission, multiplexer/demultiplexer 392 may mediate to establish the order in which radio 354 receives information from the ports. For this purpose, multiplexer/demultiplexer 392 may use any suitable policy. For example, packets carrying action frames may be given priority over packets with data frames. As another example of a policy, transmissions associated with ports operating in infrastructure mode may be given priority over ports operating in peer-to-peer mode. As yet another example, a port configured for the role of group owner may be given priority over a port configured for the role of client in a peer-to-peer group. Though, the specific policies applied by multiplexer/demultiplexer 392 are not critical to the invention, and any suitable policies may be employed.

In addition to configuring multiplexer/demultiplexer 392 to route packets, driver 344 may be configured by associating specific functional modules with each of the ports. The specific functional module associated with the port may be based on the role assigned to that port. For example, FIG. 3 illustrates five functional modules. Functional module 394A, when associated with a port, may configure that port to operate in the role of a station in an infrastructure network. Similarly, functional module 394B, when associated with a port, may configure that port for the role of an access point in an infrastructure network. Functional module 394C, when associated with a port, may configure that port for operating in the role of a controller in peer-to-peer mode. The controller, for example, may control communications as the device negotiates or renegotiates a role in a peer-to-peer group. Functional module 394D, when associated with a port, may configure that port for the role of group owner in a peer-to-peer group. Functional module 394E, when associated with a port, may configure that port for the role of client in a peer-to-peer group. Other functional modules, though no illustrated in FIG. 3, may alternatively or additionally be included.

Functional modules 394A . . . 394E may be implemented in any suitable way. For example, each of the functional modules may be implemented as a collection of computer executable instructions that are encoded to perform functions for the role associated with the functional module. For example, functional module 394A may be encoded with instructions that control radio 354 to transmit packets as appropriate for a station in an infrastructure network. Additionally, functional module 394A may contain instructions that allow driver 344 to interact with operating system 320 in a way that implements the behaviors of a station in an infrastructure network. As a specific example, functional module 394A may be encoded to automatically generate responses to certain received frames. Additionally, functional module 394A may be encoded to transfer data received in a frame to a location in memory on computing device 310 and then notify operating system 320 that data has been received. Further, functional module 394A may configure radio 354 for the role of that functional module. Such configuration may include setting a number of subchannels or other parameters of the wireless communications used in the specified role. The operations performed by functional module 394 may be similar to those performed in a conventional driver for a wireless network interface card configured only as a station in a Wi-Fi network, and functional module 394 may be encoded using techniques as are known in the art.

Each of the other functional modules may be similarly encoded to interact with the operating system 320 and radio 354 to configure radio 354 and to internally process and generate communications as appropriate for its respective role. Functional module 394B, for example, may be encoded with computer executable instructions that perform operations on or respond to received frames with behaviors as are known in the art for an access point in an infrastructure network. Also, functional module 394B may be encoded to interact with operating system 320 using techniques as are known in the art.

Functional module 394C may be encoded to perform functions associated with establishing a peer-to-peer group. The instructions that implement functional module 394C may likewise be written using techniques that are known in the art. Those instructions may cause radio 354 to transmit packets containing action frames or responses to action frames of the type used in establishing a group for peer-to-peer communication according to a specific protocol and that negotiate or renegotiate roles of devices for such a group. Components within operating system 320 may trigger the sending of those action frames. Though, for some action frames, functional module 394C may be configured to generate a response to an action frame without express action by operating system 320. Table 1 lists examples of action frames that functional module 394C may be commanded to send by operating system 320. These action frames represent action frames appropriate for a Wi-Fi Direct protocol. Additional action frames used in that protocol may be sent without an express command in response to a received action frame or other suitable trigger. Though, it should be appreciated that different or additional action frames may be used for different protocols, and the specific action frames is not a limitation on the invention.

TABLE I

| Action Frame | Dialog Token Generated by Driver | Port Remains Available After Successful Transmission For Receiving Replies | Receive Indicated to OS |
|---|---|---|---|
| GO Negotiation Request | Yes | Yes | Yes |
| GO Negotiation Response | No | Yes if the response indicates that the negotiations were successful, No Otherwise | Yes |
| GO Negotiation Confirmation | No | No | Yes |
| P2P Invitation Request | Yes | Yes | Yes |
| P2P Invitation Response | No | No | Yes |
| Provision Discovery Request | Yes | Yes | Yes |
| Provision Discovery Response | No | No | Yes |

When the operating system 320 submits a request to a control port to send one of the action frames in Table I, functional module 394C within driver 344 may take actions such as:
  a. Select a dialog token for the transmission. If the send is in response to a request, the operating system may provide the dialog token (as described below) to be used, and driver 344 may then use the specified dialog token.
  b. Complete the request. If driver 344 selected the dialog token, it may report the dialog token to the operating system 320 in the completion of the request.
  c. Sync with the Wi-Fi Direct device to which the frame is targeted. Depending on the implementation, if the send is in response to a received request (e.g. Invitation Response sent on reception of an invitation request), this step may be omitted.
  d. Send the frame & wait for an ACK.
  e. Once the ACK for the frame is received or if none of the retry attempts get an ACK, send a NDIS_STATUS indication to operating system 320 to notify about the transmission status of the action frame. This indication may include the information elements from the packet containing the action frame.

If the send was for a frame that would receive a reply from the peer device and the transmission was successful, the port may remain available for the peer device to send reply action frames to the miniport. The timeout and mechanism of being available may follow the Wi-Fi Peer-To-Peer Technical Specification.

The specific component within operating system 320 that triggers functional module 394C to send action frames when functional module 394C is associated with a port is not critical to the invention. However, FIG. 3 illustrates a device manager 330 within operating system 320. Device manager 330, for example, may be a device manager as is known in the art that may present a user or programmatic interface through which a user or other executing component may request that a communication session be established with a device using peer-to-peer communication.

When a port, such as port 386, is configured to act as a controller for peer-to-peer communication by associating that port with functional module 394C, device manager 330 may interact with port 386 to control various aspects of establishing peer-to-peer communication with one or more devices. For example, device manager 330 may receive user input requesting that computing device 310 be wirelessly connected to a device such as printer 134 (FIG. 1A). In response to such input, device manager 330 may interact through stack 322 with port 386, causing functional module 394C to control radio 354 to transmit action frames.

The transmitted action frames may be those associated with device or service discovery. Device manager 330 may specify the nature of those requests, such as whether functional module 394C should seek to discover any device in the vicinity of computing device 310 or only devices that provide an identified service, such as a printer service. Though, device manager 330 may be configured to send commands in other formats through port 386 to establish communication with one or more devices in a group.

As an example, FIG. 3 shows that operating system 320 maintains a persistent device store 328. Persistent device store 328 may contain information identifying devices with which computing device 310 has previously established wireless communication. Such information, for example, may constitute persistent group profiles, one or more of which may be associated with an identifier of a user. Information in persistent device store 328 may indicate remote devices that have been designated as auto-connect devices for computing device 310. Such information may be used for scanning for those auto-connect devices and/or determining whether to connect automatically to a device that attempts to initiate a connection with computing device 310. In scenarios in which computing device 310 has been designated as an auto-connect device for another wireless device, persistent device store 328 may store information about the wireless device for which computing device 310 has been designated as an auto-connect device. Alternatively or additionally, persistent device store 328 may store information indicating whether a wireless device has delegated to computing device 310 the role of initiating a connection. Device manager 330, or other suitable component within computing device 310, may use such information to trigger computing device 310 to scan for such a wireless device and/or broadcast availability of that wireless device and/or transmit to that wireless device messages reporting on the presence of devices designated as auto-connect devices for it.

Device manager 330 may access information in persistent device store 328 to identify specific devices and send commands through port 386 for functional module 394C to generate action frames to establish a wireless connection with a device identified in persistent device store 328. These actions may occur automatically, in response to user input or in response to any other suitable trigger.

In scenarios in which device manager 330 requires information, such as a password or identifier, to establish communication with an external device, device manager 330 may alternatively or additionally interact with a user through a user interface (not expressly shown in FIG. 3) to obtain that information from a user or some other source. That information, which, for example, may be obtained during pairing of computing device 310 to one or more remote devices, may be stored in persistent device store 328. In this way, information obtained from a user, such as during a pairing ceremony with a remote device need not be acquired from the user again to re-establish a peer-to-peer connection with the remote device. Rather, the information may be obtained from persistent device store 328. Though, regardless of the manner in which information input from a user is acquired, when that acquired information needs to be transmitted, device manager 330 may interact with the port configured as a controller to cause that information to be sent.

Regardless of the mechanism that triggers a port configured as a control port, such as port 386, to identify a group of devices, the control port may send and receive action frames to identify one or more devices that form a group including computing device 310. The actions initiated through port 386, in addition to identifying the group, may negotiate a role for computing device 310 within that group. In the illustrated example of the Wi-Fi Direct peer-to-peer protocol, a device may have a role in a group as the group owner or as a client. Communication with another device or devices in the identified group may be performed through a different port. That port may be configured to support behavior in the role identified for computing device 310.

In the example illustrated in FIG. 3, additional ports 388 and 390 are illustrated. Each of these ports may be associated with a different role. For example, port 388 may be associated with the role of group owner. Port 390 may be associated with the role of client. Configuring a port for a different role may be performed by associating the port with the functional module that performs operations associated with the role. For example, functional module 394D, which performs functions associated with a device operating as a group owner, may be associated with port 388. Likewise, functional module 394E, which performs functions associated with the device operating as a client, may be associated with port 390.

In operation, as packets are received through radio 354 having MAC addresses associated with ports 388 or 390, multiplexer/demultiplexer 392 will route those packets for processing within the associated port. Packets routed to port 388 may be processed by functional module 394D, which may perform actions associated with the role of a group owner. Packets containing data frames may be processed by placing the data in memory and notifying stack 322 that data has been received. Such an interaction with operating system 320 may use stack signaling techniques as are known in the art. Though the specific mechanism by which communication between each port and operating system 320 occurs is not critical to the invention.

When action frames are sent as part of a session established with a group in which computing device 310 is the group owner, those action frames may likewise be routed by multiplexer/demultiplexer 392 to port 388. Functional module 394C may be configured to either respond to those action frames or may be configured to report the action frames to operating system 320 depending on whether functional module 394C is programmed to respond to them.

Similarly, if computing device 310 is configured for the role of a client in a group, packets relating to communication with devices in that group will be identified with a MAC address that causes multiplexer/demultiplexer 392 to route those packets to a port configured as a client, such as port 390. Port 390 may be associated with functional module 394E, implementing functionality of a client according to a peer-to-peer protocol. Functional module 394E may be configured to transfer data from data frames in such packets to memory and notify operating system 320 of that data, using techniques as are known in the art. Functional module 394E may respond to packets containing action frames or may notify operating system 320 of those management frames.

Additionally, functions performed by a device operating in accordance with the peer-to-peer protocol may include detecting a remote device with which a persistent peer-to-peer group was previously formed and that has been designated as an auto-connect device. Upon detecting such a remote device, functions performed by the device may include establishing communication with that remote device based on previously stored persistent profile information. These functions may be implemented by appropriately configuring functional module 394C. Though, any suitable implementation may be used.

FIG. 3 illustrates a specific hierarchy of communication functions. Certain functions relating to communication with external devices are performed within radio 354. Other functions are performed within driver 344. Yet further functions are performed within operating system 320. Though not specifically illustrated, even further functions may be performed by applications 220 (FIG. 2) or by input from a user or source external to computing device 310. With such an architecture, higher level functions, such as determining which devices to connect to as part of a peer-to-peer group, may be performed at higher levels in the architecture. Conversely, lower level functions, such as generating an acknowledgement to a received packet may be performed at lower levels in the architecture. For example, driver 344 may be configured to generate such an acknowledgement.

Though other architectures are possible that may partition the functions differently so that different aspects of communication are controlled by different components, in the example illustrated, radio 354 and driver 344 are configured to respond statelessly to events, such as commands or received packets. To the extent state information is involved in a communication session, that state information may be maintained within operating system 320. For example, stack 322 may maintain state information for communication sessions carried on through any of the ports 382, 384, 386, 388 and 390. The specific state information maintained may depend on the number and types of states within a protocol supported by each of the ports.

In the example of FIG. 3, session state information 324A is shown associated with port 388. Though not expressly illustrated, session state information may be maintained for other ports. Depending on the protocol implemented by port 388, such session state information may indicate parameters of a session, such as a number of devices that are joined in a group for which computing device 310 is the group owner. Other state information, such as a time until those devices may enter a lower power mode, may also be stored as part of the session state information 324.

FIG. 3 additionally shows session state information 324B and 324C associated with port 388. State information 324B and 324C may describe different sessions. Such sessions may arise if computing device 310 is joined in three groups in which it is the group owner. To support multiple such sessions, a mechanism may be provided to associate specific frames sent or received with a corresponding session. Any suitable identifier or identifiers may be used. For example, communications with a group of devices may be regarded as a session, such that an identifier of a group may be used to aggregate related communications as part of a session. Stack 322 provides an interface to device manager 330 or other components that associates each session with the appropriate component that is an end point in that session. Such interfacing may be performed using techniques as are known in the art.

In addition to maintaining state information that allows communications from separate sessions to be presented appropriately, stack 322 may maintain, as part of the state information maintained for each session, information that allows stack 322 to relate communications that are part of an exchange of communications to perform a function. For example, when a frame, representing a request, is sent, recognizing that a subsequently received frame is a response to that request may facilitate processing of the request and response. Providing a mechanism to relate communications that are part of an exchange may facilitate processing, particularly if multiple sessions are supported on the same port. To enable recognition of communications that are part of an exchange, "dialog tokens" may be used. A communication initiating an exchange may be tagged with such a dialog token. Upon responding to such a communication, the dialog token from the request may be copied to the response. Accordingly, a device sending a request may associate a response, or any other communication that is part of the same exchange, with the request. Accordingly, state information 324A may contain dialog tokens associated with ongoing communications involving any device communicating as part of the session.

Dialog tokens may be generated in any suitable way. They may be generated, for example, within the operating system 320. Alternatively, if a packet beginning a dialog is initiated in a port, the port or other component within driver 344 may generate the token. Similarly, if a reply to a packet is generated within a port, such as port 386, 388 or 390, the token may be inserted in the reply by that port. Conversely, if a reply to a packet is initiated in response to a command generated within operating system 320, a component within operating system 320, such as stack 322 may specify the token for inclusion in the reply. Table I indicates, for the listed action frames, whether the dialog token associated with an action frame is generated in the operating system or, if not, in the driver. Though, it should be appreciated that Table I represents only one example of how the functionality of generating a dialog token for a frame may be partitioned, and any suitable partitioning of that function may be used.

Similar session state information 326A, 326B and 326C is shown in connection with port 390. Session state information 326A, 326B and 326C may represent state maintained for each of three sessions, with each session being associated with a group in which computing device 310 is a member with the role of client. As with session state information 324A, 324B and 324C a unique dialog token may be associated with each of the sessions, allowing stack 322 to separate received packets associated with each of the sessions. Likewise, computing device 310 may cause a dialog token to be associated with packets transmitted from computing device 310. The dialog tokens may be used to allow stack 322, or similar processing components on remote devices that receive packets from computing device 310, to associate packets that are part of a multi-packet exchange of information. For example, a second packet sent in reply to a first packet may include the token from the first packet. As a result, when the sender of the first packet receives the second packet, it can associate the first packet and second packet with the same dialog.

With the architecture illustrated in FIG. 3, state information concerning each of the connections may be maintained within operating system 320. As a result, the ports 386, 388 and 390 need not maintain state information. In some embodiments, functional modules, such as functional modules 394C, 394D and 394E, that implement the functions of a port do not maintain state information. Rather, each of the functional modules may be encoded to respond to events, such as a command from operating system 320 or a received packet passed on by radio 354. Though, regardless of how this functionality is partitioned, computing device 310 may be controlled to supply functionality associated with multiple entities by establishing and configuring a port to perform the functionality of each entity. As a result, computing device 310, because driver 344 and radio 354 may be configured to support multiple ports, may concurrently operate as different entities. These entities may include entities associated with infrastructure mode communication as well as entity associated with peer-to peer communication.

Though, regardless of how a computing device is architected, the device may implement functions defined in an infrastructure mode protocol and/or a peer-to-peer protocol. Functions performed by a device operating in accordance with a peer-to-peer protocol may include forming a group of two or more devices for peer-to-peer communication. One aspect of forming a group may include selecting a device of the group to perform functions associated with control of the group. Such functions, for example, may include determining which devices are allowed to join the group, providing an identifier for the group and providing addresses for devices within the group. In the example embodiment described herein, such a device may be a group owner. Other devices that are part of the group may be clients of the group owner.

Another aspect of forming a group may be determining whether the group is to be a persistent group. Whether a group is to be a persistent group may be determined based on information exchanged between devices, or in any suitable way. If the group is persistent, forming a group may entail creating and storing a persistent group profile. In some embodiments, forming a group may also entail designating one or more remote devices in the group as an auto-connect device. Such a designation may by stored in the persistent group profile for the group and may also be communicated, such as in an action frame transmitted by functional module 394C or other suitable component, to the remote device. A determination of whether a remote device should be designated as an auto-connect device may be made in any suitable way, including by receipt of information through a user interface, such as user interface 150, or analysis of information received from or about the remote device.

Yet a further aspect of forming a group may be detecting a nearby known device, selecting a persistent group profile that is appropriate for forming a group with that device and then forming that group based on the persistent group profile and/or a designation that a nearby device has been designated as an auto-connect device.

Figure 4:
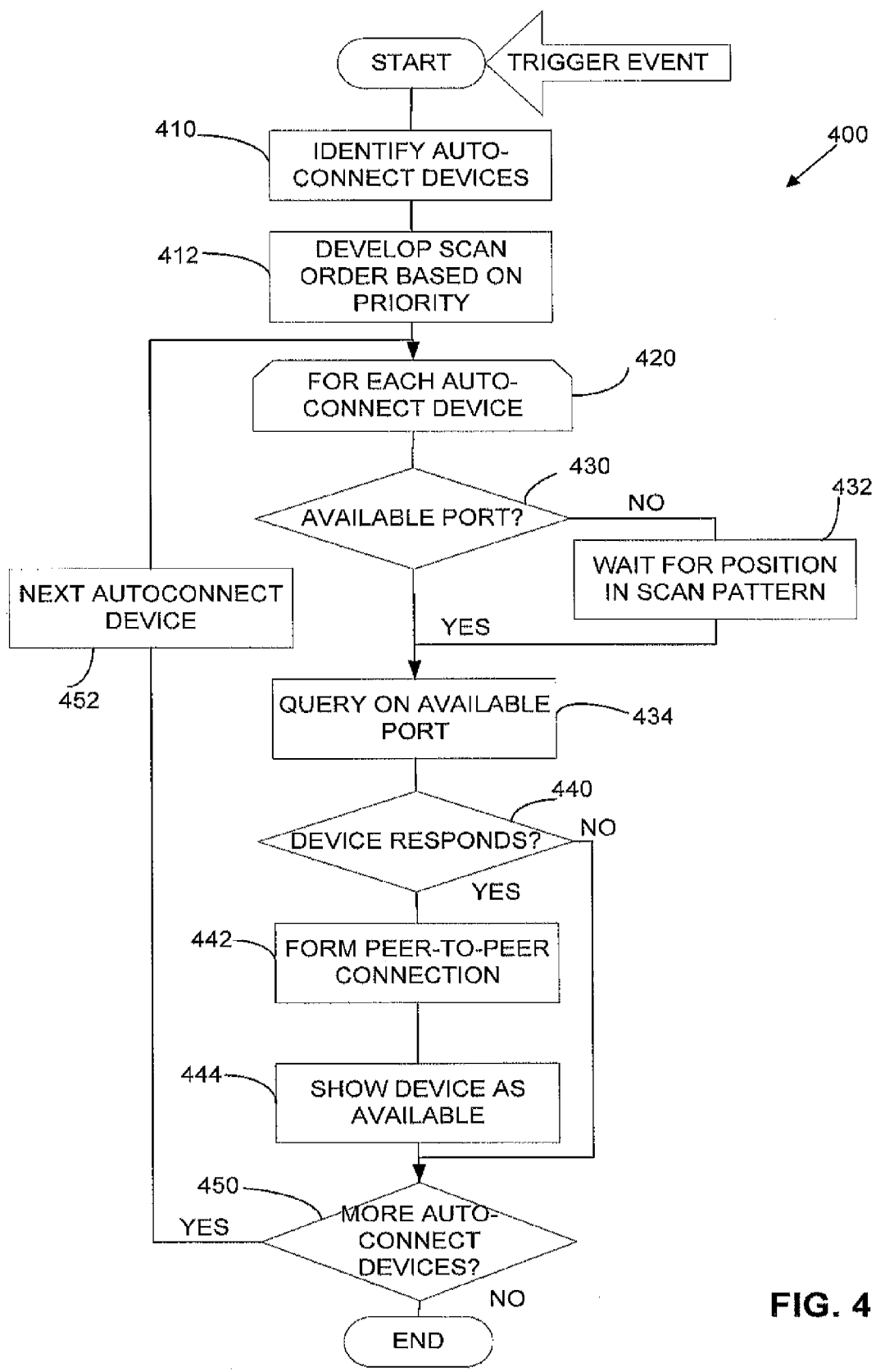
FIG. 4 is a flowchart of an exemplary method of operating a wireless device to scan for an auto-connect device.

FIG. 4 illustrates a method by which a device configured to automatically form connections with remote devices designated as auto-connect devices. The method 400 may be implemented by a wireless computing device having an architecture as illustrated in FIG. 2 or FIG. 3. Though, the invention is not so limited, and any suitable wireless device may perform the method 400.

The method 400 begins upon detection of a trigger event. Any suitable event may act as a trigger event. In some embodiments, powering on the wireless device executing the method 400 may act as a trigger event. Alternatively or additionally, an event that causes the wireless device to wake up from a low powered sleep state may act as a trigger event.

As another example, the wireless device may detect that it has entered a new environment or may detect a context that has been deemed a trigger event. Such trigger events may be detected using environmental sensors or other techniques as are known in the art or in any other suitable way.

Regardless of the nature of the trigger event and the manner in which it is detected, upon detection of a trigger event, the method 400 may proceed to block 410. At block 410, the wireless device may identify auto-connect devices. Any suitable technique may be used to identify auto-connect devices. In some embodiments, auto-connect devices may be identified by reading from a persistent device store information about devices that have been previously designated as auto-connect devices. In other embodiments, auto-connect devices may be identified based on information provided from an external source, such as downloaded over a network or provided by a proxy device.

In some embodiments, priorities may be assigned to auto-connect devices. Priorities may be assigned in any suitable way. In some embodiments, priorities may be assigned by user input. Express user input may be provided to specify a priority. For example, a graphical user interface such as graphical user interface 150 (FIG. 1C) may be modified to include an input field for each designated auto-connect device through which a user may associate a priority with each designated auto-connect device. Alternatively or additionally, priorities may be associated with devices based on received information about the devices. For example, a priority may be assigned to an auto-connect device based on the type, functionality or other characteristic of the device. As a specific example, human interface devices that will allow a user to provide inputs or obtain outputs from a wireless device may be given a relatively high priority. A printer or mass storage device that is not typically used in an interactive fashion may be given a lower priority. Though, the specific mechanism by which priorities are assigned to auto-connect devices is not critical to the invention.

In embodiments in which priorities are associated with auto-connect devices, the priorities may be used to determine the order in which connections are attempted with the auto-connect devices. Alternatively or additionally, relative priorities may be used to determine for which auto-connect devices connections are formed in scenarios in which the wireless device executing method 400 is limited in the number of connections that can be simultaneously active. Accordingly, method 400 may proceed to block 412 where a scan order is developed based on the priorities of the auto-connect devices identified at block 410. In embodiments in which priorities are not used, processing at block 412 may be omitted.

Method 400 may proceed to loop start 420. Loop start 420 may be the beginning of processing that may be performed for each of the auto-connect devices identified at block 410. The auto-connect devices may be processed in the order established at block 412.

The loop started at loop start 420 continues to decision block 430. At decision block 430, method 400 may branch, depending on whether the wireless device executing method 400 has additional ports available for a further connection to a remote device. In an embodiment in which the method 400 is implemented by a computing device such as computing device 310 (FIG. 3) in which a group 380 of ports is designated for a peer-to-peer connection, processing at decision block 430 may entail determining whether any of the ports in group 380B is available for forming a further connection to a remote device.

If a port is available, method 400 may proceed to block 434 where a query for the auto-connect device is transmitted for the available port. In some embodiments, such a transmission may be made by the available port. In other embodiments, the transmission may be made by a control port, with the connection formed through the available port, if the auto-connect device is detected. The query may identify the remote auto-connect device in any suitable way.

In some embodiments, remote devices are assumed to enter, from time to time, a low power state in which the remote device cannot receive and respond to a query. Accordingly, a sequence of queries may be transmitted for a remote device. The sequence may be transmitted in accordance with a pattern intended to result in a query in the sequence being transmitted at a time when the remote auto-connect device is not in the low power state and is therefore available to receive and respond to the query.

In some embodiments, when there are more auto-connect devices then there are available ports, queries directed to each of the auto-connect devices may be sent as part of a scan pattern in which queries for different devices are transmitted in different segments of the pattern. Accordingly, method 400 may branch from decision block 430 to block 432 when there are no ports available for transmitting queries to detect whether a specific auto-connect device is in the vicinity of the computing device executing method 400. At block 432, processing of a further auto-connect device may wait until there is an available position in the scan pattern at which queries for that auto-connect device may be transmitted. At such time, method 400 may proceed from block 432 to block 434 where one or more queries are transmitted for that device.

Regardless of how processing reaches block 434, once queries for an auto-connect device are transmitted, the process may proceed to decision block 440. At decision block 440, method 400 may again branch, depending on whether the remote auto-connect device responds. If the remote auto-connect device responds, method 400 proceeds to block 442. At block 442, the wireless device forms a peer-to-peer connection with the remote auto-connect device. In the embodiment illustrated, such a connection may be formed without any express or even implied user input at the time the connection is formed.

Processing at block 442 may be performed in any suitable way, including by an exchange of action frames and other messages in accordance with a peer-to-peer protocol as is known in the art. As a specific example, messages exchanged at block 442 may be formatted in accordance with the Wi-Fi Direct protocol. The content of the messages transmitted may be based on information stored about the remote auto-connect device that has been designated as a member of a persistent group. Such information may be retrieved from a persistent device store, such as store 328 (FIG. 3). Though, the specific source and nature of the information used to form a connection with a remote auto-connect device is not critical to the invention.

Once a connection to a device is formed, applications and other components executing on the wireless computing device may access that device. As just one example of how a remote device may be accessed, a device manager, such as device manager 330 (FIG. 3) may display to a user that such a device is available. As a result, user input signifying an operation to be performed that involves interaction with the remote auto-connect device can be performed without a delay associated with forming a connection with that device, which may contribute to a desirable user experience for the user of the wireless device executing method 400.

Once processing of an auto-connect device has been completed, method 400 may proceed to decision block 450. At decision block 450, the process may again branch, depending on whether additional auto-connect devices remain for processing. If so, method 400 may branch to block 452 where the next auto-connect device in the order established at block 412 may be selected. Method 400 may then loop back to loop start 420 where the steps of detecting whether the selected auto-connect device is in the vicinity of the wireless device and forming a connection to the remote auto-connect device are repeated. In this way, connections may be automatically formed to multiple auto-connect devices that are in the vicinity of the wireless device executing method 400. In scenarios in which a selected auto-connect device is either not in the vicinity, executing other operations that preclude forming a connection or is configured to not respond to an attempt to automatically form a connection, no connection may be formed to such a remote auto-connect device. In that scenario, method 400 may branch from decision block 440 directly to decision block 450, bypassing the steps of forming a peer-to-peer connection to the remote device.

In method 400, for each selected auto-connect device, one or more queries may be transmitted in an attempt to establish communications with the remote auto-connect device. The queries may be sent in accordance with a scan pattern. The scan pattern may include multiple segments in which queries are transmitted with different characteristics. For example, from segment to segment, the timing characteristic with which queries are transmitted may change. Alternatively or additionally, the remote auto-connect devices to which queries are directed may change from segment to segment.

FIG. 5A is a timing diagram illustrating a suitable scanning pattern. In the example of FIG. 5A, a single port on a wireless device is used for transmitting queries. These queries are directed to a single remote auto-connect device. In this example, a wireless device repeatedly transmits a query to the remote auto-connect device at a rate that decreases from segment to segment. In the example of FIG. 5A, three segments, with three different frequencies are illustrated. The scan pattern 510 begins in response to a trigger event 500. Trigger event 500 may be a trigger event as described above or any other suitable event. In response to such an event, a wireless device may begin scan pattern 510 in segment 510A. In 510A, queries $512_A \ldots 512_E$ may be transmitted. In this example, the queries occur relatively frequently, which would allow the wireless device to quickly identify the remote auto-connect device, if it is in the vicinity and available for an auto-connection.

At the end of segment 510A, scan pattern 510 proceeds to segment 510B. In segment 510B, queries $514_A \ldots 514_E$ are transmitted. In this example, the queries in segment 510B are transmitted with a lower frequency than during segment 510A. The spacing of queries in segment 510B may be selected to allow the wireless device to quickly detect a remote auto-connect device, if the remote auto-connect device is occasionally entering and exiting a low powered sleep state. The intervals between the queries $514_A \ldots 514_E$ may be selected such that a query transmitted during segment 510B is likely to coincide with a time when the remote auto-connect device is awakened from a low powered sleep state and available to receive and respond to a query, if the remote auto-connect device is in the vicinity of the wireless device.

If the remote auto-connect device is not detected during segment 510B, pattern 510 may proceed to segment 510C. In segment 510C, queries, such as queries $516_A$ and $516_B$ are transmitted. In this example, the frequency with which queries are transmitted is even lower than in segment 510B. Though not illustrated in FIG. 5A, segment 510C may continue for a relatively long period of time, and in some embodiments may continue indefinitely during operation of the wireless device. Though, in other embodiments, a maximum duration of segment 510C may be specified such that the wireless device ceases transmitting queries for the remote auto-connect device if not detected after some threshold amount of time following the trigger event 500.

As a specific example, segment 510A may last for approximately five seconds and during segment 510A, queries may be transmitted at a rate of approximately one per second. Segment 510B may last for approximately 60 seconds and queries may be transmitted during segment 510B at a rate of approximately one every ten seconds. During segment 510C, queries may be transmitted at a rate of approximately one per minute.

FIG. 5B illustrates an alternative scan pattern 520. In this example, scan pattern 520 may involve transmissions from two ports of a wireless device. In the embodiment illustrated, scan pattern 520 uses segments similar to those in scan pattern 510 (FIG. 5A). Each of the segments 520A, 520B and 520C, for example, may have a duration and include transmission of queries at rates comparable to those for the corresponding segments 510A, 510B and 510C (FIG. 5A). Though, any suitable duration and rate of query transmission may be used. In scan pattern 520, different ports on a wireless device are used for transmission of queries during different segments. For example, queries in segment 520A and query 520C may be transmitted through Port 1 of a wireless device. Queries of segment 520B may be transmitted through Port 2 of the wireless device.

FIG. 5B illustrates that scan pattern 520 begins in response to a trigger event 500, which may be any suitable trigger event, including trigger events as described above. Scan pattern 520 begins in segment 520A when queries $522_A \ldots 522_E$ are transmitted through Port 1. In this example, queries $522_A \ldots 522_E$ may be directed to a first remote device that has been designated as an auto-connect device for the wireless device transmitting queries in accordance with scan pattern 520. As with segment 510A, segment 520A may last for a predetermined duration, unless the remote auto-connect device that is the target of queries $522_A \ldots 522_E$ responds before the end of the segment, in which case the scan pattern may be truncated because further queries are not transmitted to the device once it responds.

Scan pattern 520 may continue on to segment 520B. In this example, queries $524_A \ldots 524_E$ are transmitted from Port 2 during segment 520B. In some embodiments, queries $524_A \ldots 524_E$ may be directed to the same target device as queries $522_A \ldots 522_E$. However, in this example, Port 2 is configured to send queries directed to a different target device. Accordingly, queries $524_A \ldots 524_E$ may be directed to a different auto-connect device than queries $522_A \ldots 522_E$. As with segment 510B, segment 520B may be of a predetermined duration, unless the device that is the target of the queries responds before the end of the segment.

Scan pattern 520 continues with a segment 520C. In this example, segment 520C includes queries $526_A$ and $526_B$ transmitted through Port 1 of the wireless device. These queries may be directed to the same auto-connect device as queries $522_A \ldots 522_E$. As with segment 510C, segment 520C may extend for a longer duration than illustrated in FIG. 5B. That duration may be predetermined or established based on operating conditions. Segment 520C, for example, may extend until the auto-connect device that is the target of the queries transmitted during segment 520C responds or until some other event occurs.

FIG. 5C illustrates a further example of a scan pattern 530. Scan pattern 530, like scan patterns 510 (FIG. 5A) and 520 (FIG. 5B) includes transmission of queries through two ports on a wireless device. Also like scan patterns 510 and 520, scan pattern 530 is initiated in response to a trigger event 500. Scan pattern 530, like scan patterns 510 and 520, also includes segments during which queries directed to target auto-connect devices are transmitted. Those segments are arranged such that the time between transmissions of queries lengthens as time passes without a response from the target device.

FIG. 5C illustrates that when multiple independent ports are available, queries targeted at different devices may be transmitted through the separate ports in overlapping intervals. Accordingly, FIG. 5C shows that during segment 530A, queries $532_{A1} \ldots 532_{E1}$, directed at a first target device may be transmitted through Port 1. Also in segment 530A, queries $532_{A2} \ldots 532_{E2}$, directed to a second auto-connect device may be transmitted through Port 2. Similarly, in segment 530B, queries $534_{A1} \ldots 534_{E1}$ may be transmitted through Port 1 while queries $534_{A2} \ldots 534_{E2}$ are transmitted through Port 2. In this example, queries $534_{A1} \ldots 534_{E1}$ are directed to the first auto-connect device and queries $534_{A2} \ldots 534_{E2}$ are directed to the second auto-connect device.

Similarly, in segment 530C, queries $536_{A1}$ and $536_{B1}$ are transmitted through Port 1 and directed at the first auto-connect device. In the same segment, queries $536_{A2}$ and $536_{B2}$ may be transmitted through Port 2 and directed to a second auto-connect device. As with segments 510C and 520C of scan patterns 510 and 520, segment 530C may continue indefinitely unless a target device responds. Once a target device responds, scan pattern 530 may be truncated because further queries need not be sent to an auto-connect device once it has responded.

FIG. 5D illustrates yet a further scan pattern 540, which may be used in some embodiments. Scan pattern 540 includes transmissions through two ports of a wireless device. As with the scan patterns 510, 520, and 530, scan pattern 540 may begin in response to any suitable trigger event 500. Also, scan pattern 540 includes queries transmitted through two ports of a wireless device. In this example, queries transmitted from each port are directed to a different auto-connect device. Accordingly, in segment $540A_1$, queries $542_{A1} \ldots 542_{E1}$ are transmitted through Port 1. These queries are transmitted at a first rate and targeted at a first auto-connect device. A similar segment $540A_2$ involves transmission through Port 2 of queries $542_{A2} \ldots 542_{E2}$. In this example, the queries transmitted during segment $540A_2$ are targeted at a second auto-connect device.

During segment $540B_1$, queries $544_{A1} \ldots 544_{E1}$ are transmitted through Port 1. These queries may be directed at the first auto-connect device. During segment $540B_2$, queries $544_{A2} \ldots 544_{E2}$ may be transmitted through Port two. These queries may be directed at the second auto-connect device. The queries transmitted during segments $540B_1$ and $540B_2$ may be transmitted at a slower rate than during segments $540A_1$ and $540A_2$. Such a pattern lengthens the time between queries as time passes without the target auto-connect device responding. This pattern may continue into one or more successive segments, here illustrated as segment 540C. During segment 540C, further queries may be sent to the target auto-connect devices until such time as the target auto-connect device responds or an event ending the scanning is detected. The rate at which queries are transmitted during segment 540C may be even slower than during segments $540B_1$ and $540B_2$.

FIGS. 5A . . . 5D illustrate variations in a scan pattern that may be used by a wireless device to determine whether a remote device designated as an auto-connect device is in its vicinity. Though, it should be appreciated that other scan patterns are possible. Further, it should be appreciated that, though the scan patterns of FIGS. 5A . . . 5D are described as being used as a wireless device for which another device has been designated an auto-connect device, similar scan patterns may be used by the device designated as the auto-connect device if the scanning function has been delegated to that device. For example, as described in connection with FIG. 1F, identification of devices to form an automatic connection has been delegated to display 134F. Accordingly, in that example, display 134F may scan for devices, such as computing device 110F and keyboard 130F using any of the patterns described in FIGS. 5A . . . 5D, or any other suitable pattern.

In the examples provided in FIGS. 5A . . . 5D, the wireless device scanning for an auto-connect device has been configured to recognize a number of auto-connect devices that is less than or equal to the number of available ports the wireless device has available for transmission of queries targeted to devices that have been designated as auto-connect devices. As described above, any number of suitable devices may be designated as auto-connect devices for a wireless device and the wireless device may hold in a persistent device store, such as persistent device store 328 (FIG. 3), profiles for more auto-connect devices than the wireless device has available ports for transmitting queries. As described above in connection with FIG. 4, the auto-connect devices may be ordered based on a relative priorities assigned to the auto-connect devices.

In some embodiments, rather than selecting a subset of auto-connect devices for which to scan, a wireless device may intermix segments in a scan pattern in which queries are targeted at different auto-connect devices. As an example, in an embodiment in which more than two remote devices have been designated as auto-connect devices for a wireless device, but the wireless device has only two available ports, the wireless device may adapt scan pattern 530 for attempting to determine whether any of the designated auto-connect devices are in its vicinity. As an example of such an adaptation, during segment 530A, the wireless device may select a subset consisting of two of the auto-connect devices and transmit queries through each of the ports for one of the selected auto-connect devices. During a subsequent segment of the scan pattern, such as segment 530B, the wireless device may select a further subset of the auto-connect devices and transmit queries targeting those devices through the available ports. This pattern may continue, with a different subset being selected in each segment. For a segment, such as segment 530C which may continue indefinitely, a different target auto-connect device may be selected for each query.

Though, any mechanism for alternating among auto-connect devices may be used. For example, during segment 530C, the set of auto-connect devices to which queries are directed through the available ports may be re-selected from time-to-time. The timing at which the set of auto-connect devices is re-selected may be constant. For example, a new set, providing a different permutation of auto-connect devices, may be selected every 60 or 90 seconds. Alternatively, a new set may be selected at intervals that increase over time. As a further alternative, the times at which a new set is selected may increase over time to some maximum value, at which point new sets will be selected at a constant rate.

Any suitable mechanism may be used to select sets of auto-connect devices. In some embodiments, the set may be selected randomly from among all of the auto-connect devices designated for a wireless device. In other embodiments, the set may be selected based on relative priorities assigned to the designated auto-connect devices. For example, a random selection, waited based on priorities may be used. Such an approach may result in queries targeting a higher priority auto-connect device occurring in the scan pattern with a greater frequency than for devices of a lower priority.

Figure 6:
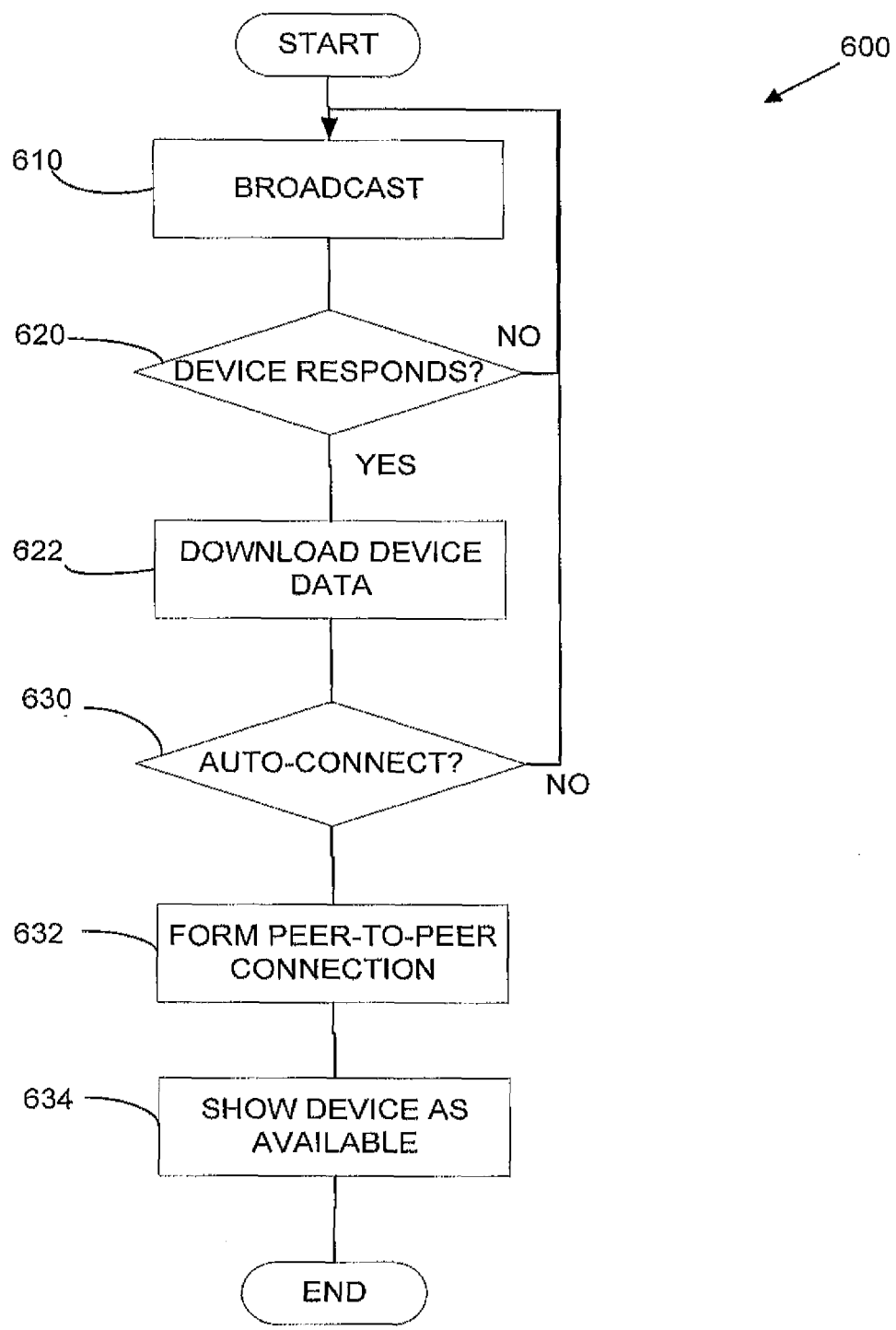
FIG. 6 is a flow chart of an exemplary method of operating a wireless device to conditionally form a peer-to-peer connection based on external data.

Regardless of the specific scan patterns used for devices intended to auto-connect to determine that they are in close enough proximity to form a peer-to-peer connection, the capabilities as described above may allow wireless devices to perform many useful functions. Examples of those functions are described in connection with FIGS. 6-9. FIG. 6 illustrates a method 600 that a wireless device may be programmed to perform such that the wireless device may identify and connect to an auto-connect device in its vicinity.

Method 600 begins at block 610 where the wireless device broadcasts a message. The message broadcast at block 610 may be a message formatted in accordance with a peer-to-peer protocol. That message may have a format that is recognized as a request for remote devices receiving the message to respond to the sender. Though, in some embodiments, the message broadcast at block 610 may qualify the type of device for which a response is requested. For example, the message transmitted at block 610 may identify a type or other characteristics of a device and may indicate that a response is requested only from devices of the specified type or having the specified characteristics. Also, it should be appreciated that a message sent at block 610 need not be a broadcast message. The message, for example, may be directed to a specific device that has been previously designated as an auto-connect device.

Regardless of the nature of the message transmitted at block 610, method 600 may proceed to decision block 620. At decision block 620, the method may branch, depending on whether a device responds to the message. If no device responds, the message may loop back to block 610 where a further message may be broadcast. The further message may be of the same form as broadcasted when processing previously occurred at block 610. Though, in some embodiments, the form of the message may change in each iteration of block 610. For example, at each iteration, a request for a different type of device to respond may be sent.

Regardless of the nature of the request sent at block 610, when a device responds to the request, method 600 will branch from decision block 620 to block 622. At block 622, the wireless device may obtain data about the device that responded. Device data may be obtained at block 622 in any suitable way. For example, in the embodiment illustrated in FIG. 1A, computing device 110 may download information 142 from a server 140 to which the wireless device is connected through an infrastructure network. However, the specific mechanism by which data on the responding device is obtained in not critical to the invention.

Once the data is obtained, method 600 may proceed to decision block 630. At decision block 630, the process may branch depending on whether the obtained data indicates that the responding device has been designated as an auto-connect device. In this embodiment, one or more devices may be designated as auto-connect devices based on a specification of a type or desired functionality for automatic connection. Such a designation may be made in any suitable way, including using techniques as described above. Suitable techniques may include express user input selecting a device type or functionality for auto-connection or implied user input, such as loading a program that is configured to form an auto-connection to a device of a specific type or functionality.

Regardless of how an auto-connect device is designated, if the device data obtained at block 622 indicates that the responding device meets the criteria specified for an auto-connect device, method 600 may proceed to block 632. If the responding device does not meet the specified criteria, method 600 may loop back to block 620 where portions of the method to identify remote devices in proximity of the wireless device executing method 600 are repeated. When method 600 reaches block 632, a responding device has been identified as an auto-connect device. Accordingly, the wireless device executing method 600 automatically may form a peer-to-peer connection with the remote device. The peer-to-peer connection may be formed in any suitable way. As one example, a peer-to-peer connection may be formed by exchanging wireless communications with the responding device formatted as action frames in accordance with a peer-to-peer protocol.

Regardless of the manner in which the peer-to-peer connection is formed, once the connection is formed, the wireless device executing method 600 may communicate with the remote device over that connection. A device manager or other suitable component within the wireless device may take steps to show that the remote device is available for communication. Any suitable techniques, including those described above in connection with block 444 (FIG. 4), may be used to show that the device is available.

Thereafter method 600 may end. However, once the remote device is shown as available, a user, applications or other components may communicate with that device as part of performing functions on the wireless device. Those functions may occur without any express user input directing the wireless device to form a connection with the remote device. Further, when such functions are executed, a user of the wireless device executing method 600 need not experience a delay associated with forming such a connection because the connection was automatically formed before user input indicating a need for the connection was provided.

Figure 7:
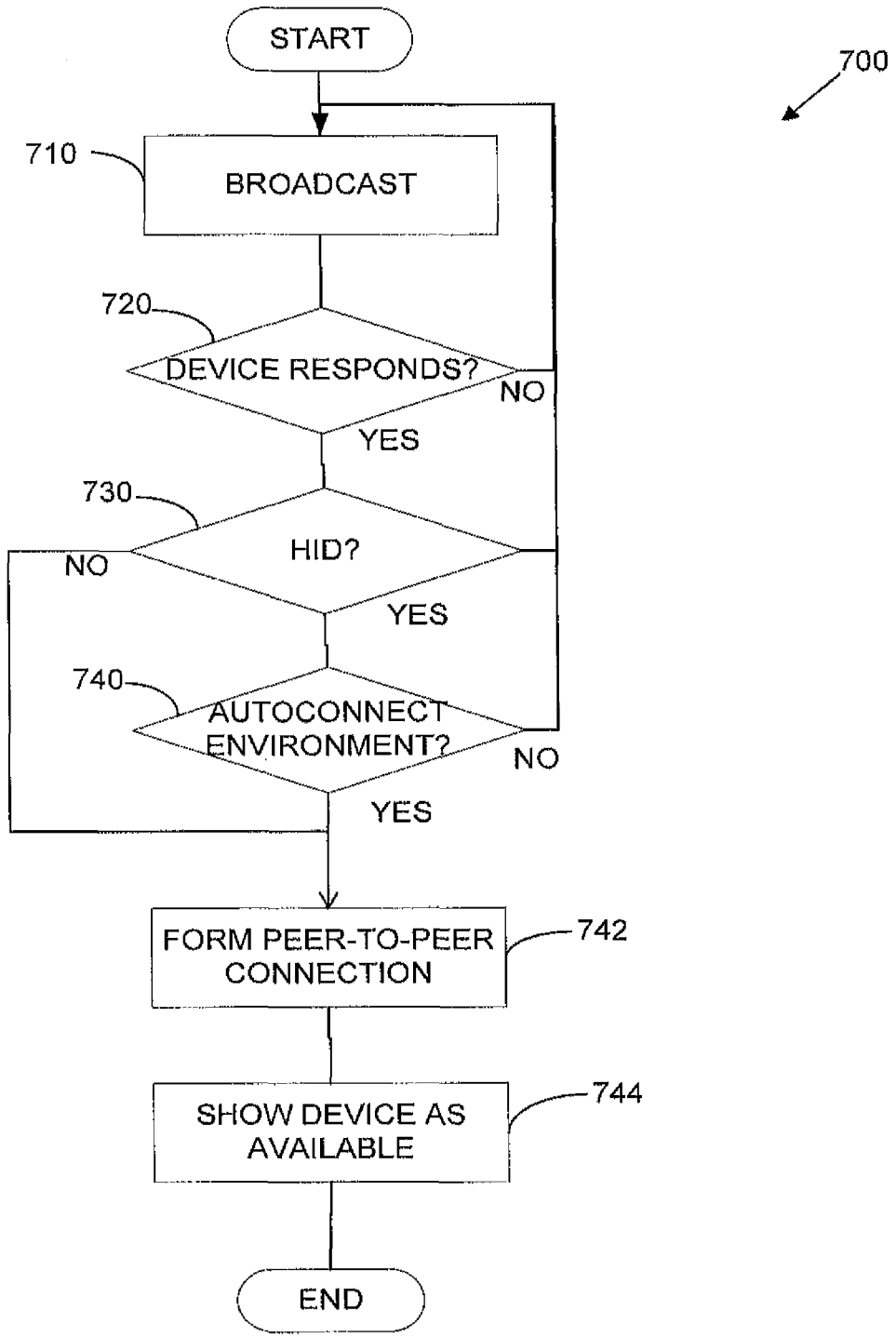
FIG. 7 is a flow chart of an exemplary method of operating a wireless device to conditionally form a peer-to-peer connection based on a type of a detected auto-connect device.

FIG. 7 illustrates an alternative embodiment of a method of operating a wireless device that may determine whether any remote devices that should be treated as auto-connect devices are in its vicinity. Method 700, like other methods described herein, may be performed by a wireless computing device, such as computing device 210 (FIG. 2) or 310 (FIG. 3). However, the specific device performing method 700 is not critical to the invention.

Method 700 may begin at any suitable time. Though not expressly illustrated in FIG. 7, the method 700 may begin in response to a suitable trigger event, including a trigger event such as trigger event 500 described above.

Regardless of the trigger event that initiates the method 700, the method may begin at block 710. At block 710, the wireless device may broadcast a message formatted to elicit a response from a remote device in the vicinity of the wireless device executing method 700. Processing at block 710 may be performed in any suitable way, including as described above in connection with bock 610 (FIG. 6).

Method 700 may proceed to decision block 720. At decision block 720, method 700 may branch, depending on whether a remote device responds to the message sent at block 710. Processing at decision block 720 may be performed in any suitable way, including as described in connection with decision block 620 (FIG. 6). As illustrated in FIG. 7, if a response is not received, method 700 may loop back from decision block 720 to block 710 where further messages may be broadcast.

Conversely, if a response is detected, method 700 may branch from decision block 720 to decision block 730. In this example, decision block 730 represents the beginning of processing that conditionally forms a connection with the responding device based on the type, functionality or other characteristics of the responding device. In this example, the wireless device executing method 700 has been configured to automatically form connections with remote devices that serve as human interface devices in certain environments. Though, in other embodiments, other conditions in the formation of an automatic connection may be used.

Accordingly, processing at decision block 730 determines whether the responding device has characteristics for which auto-connection has been designated. In this example, those characteristics relate to whether the responding device is a human interface device. FIG. 7 shows the process looping back to block 710 if the responding device is not a human interface device. In this case, portions of method 700 in which a connection to the responding device is formed are not completed. Rather, method 700 returns to block 710 where further messages are broadcast to attempt to detect other devices in proximity to the wireless device executing method 700.

Conversely, if the responding device has characteristics that have been designated as suitable for auto-connection, method 700 may proceed from decision block 730 to decision block 740. At decision block 740, a check may be made whether the environment in which the wireless device executing method 700 is operating is an appropriate environment in which to form an auto-connection with a device of the designated type. Processing at decision block 740 may entail sensing one or more characteristics of the operating environment of the wireless device. That sensing may be performed in any suitable way, including by using techniques that were described above in connection with FIG. 1D.

If the sensed environmental characteristics indicate that the wireless device is operating in an environment in which an auto-connection is appropriate, processing may proceed to block 742. This determination may be made in any suitable way. For example, the determination may be based on a comparison of sensed environmental characteristics to a policy programmed into the wireless device by a user or other suitable entity. Conversely, if the environment has not been designated as an appropriate environment for auto-connection, method 700 may loop back to block 710, without forming a connection with the responding device.

If the detected environment is consistent with an environment for which auto-connection has been designated, method 700 may proceed from decision block 740 to block 742. At block 742, the wireless device may form a peer-to-peer connection with the responding device. Processing at block 742 may be performed in any suitable way, including techniques as described above in connection with block 632 (FIG. 6).

Once the connection is formed, applications and other components executing on the wireless device executing method 700 may access that device. Accordingly, FIG. 7 illustrates that method 700 proceeds to block 744 where the device is shown as available on the wireless device. Processing at block 744 may be performed in any suitable way, including as described above in connection with block 634 (FIG. 6).

Once a connection is formed to the remote device, this connection may be used for any suitable communications with the remote device. Though FIG. 7 illustrates method 700 ending after the device is available at block 744, the wireless device executing method 700 may continue to operate, including performing functions involving communication with the remote device. However, such communications are not illustrated for simplicity.

Figure 8:
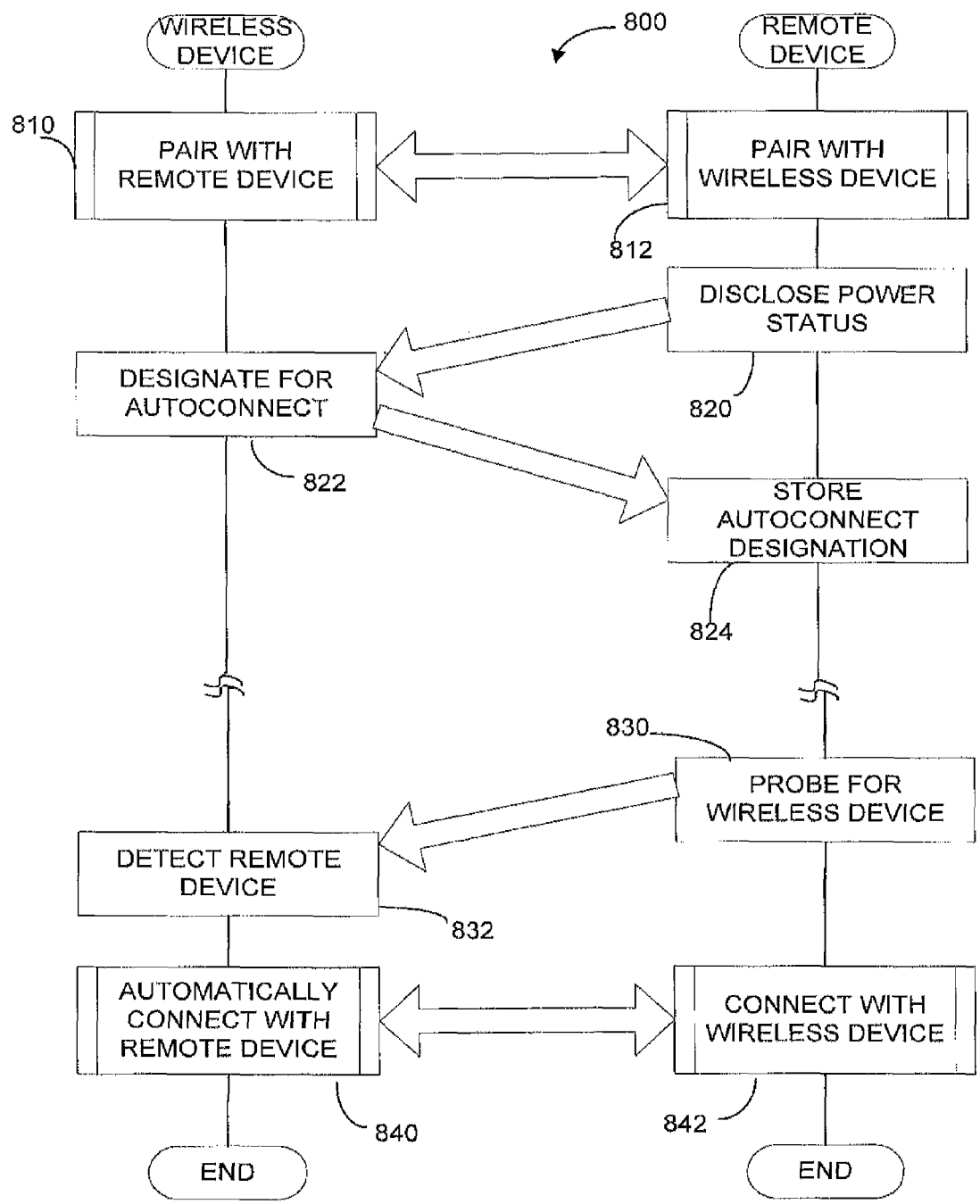
FIG. 8 is a flow chart of an exemplary method of operating devices in which a wireless device delegates to an auto-connect device the task of scanning for the devices to form an auto-connection.

FIG. 8 illustrates yet another method by which a wireless device and a remote device designated as an auto-connect device for that wireless device may automatically form a connection. In this example, the method 800 is performed by collaborative action of the wireless device and the remote device. The wireless device and the remote device may have any suitable format, either or both of the devices may be a wireless computing device, such as a wireless computing device 210 (FIG. 2) or 310 (FIG. 3). However, in some embodiments, either or both of the wireless device and the remote device may be a simpler device, such as a printer or camera, in which case, some of the applications, operating system or other components illustrated as existing on a wireless device in the examples of FIGS. 2 and 3 may be special purpose components or in some embodiments, may be omitted entirely.

Regardless of the construction of the wireless device and the remote device, the method 800 may begin at subprocesses 810 and 812. Subprocess 810 is performed by the wireless, and subprocess 812 is performed by the remote device. In subprocess 810, the wireless device exchanges messages with the remote device as part of a pairing process. In subprocess 812, the remote device exchanges corresponding messages with the wireless device as part of the pairing process. The messages exchanged in subprocesses 810 and 812 may be in any suitable format. In this example, the messages may be exchanged in accordance with a peer-to-peer protocol as is known in the art. Pairing may alternatively or additionally entail obtaining user inputs or information from sources external to the wireless device and/or the remote device. However, the specific actions performed as part of subprocesses 810 and 812 is not critical to the invention.

As a result of the pairing that results from execution of subprocesses 810 and 812, the wireless device and the remote device may exchange information. In this example, method 800 continues to block 820. At block 820, the remote device sends information to the wireless device that can be used to determine whether scanning to detect proximity of the wireless device and the remote device will be performed by the wireless device or delegated to the remote device. In this example, the information exchanged relates to the power status of the remote device. Though, in other embodiments, other information may be employed in determining which of the devices will perform the task of scanning to discover the other.

Regardless of what information is communicated from the remote device, method may continue to block 822, which is performed on the wireless device. At block 822, the wireless device may process the information received from the remote device. That information may be processed alone or in conjunction with information about the status of the wireless device. For example, in the embodiment illustrated in which delegation of the scanning function is performed based on the relative power status of devices, processing at block 822 may entail the wireless device obtaining information about its own power status and comparing it to information received about the power status of the remote device.

Power statuses may be compared in any suitable way to determine which of the devices will perform the scanning. For example, if the remote device is powered from AC power and the wireless device is powered from a battery, the remote device may be deemed to have a higher power status and, therefore, selected for performing the scanning function.

In the scenarios in which both the wireless device and remote device are powered from a depleteable power source, such as a battery, characteristics of the batteries may be used to select the device to perform the scanning. For example, the device that has a battery with a greater storage capacity or, at the time of the comparison, a larger charge may be selected to perform the scanning. However, it should be appreciated that any suitable criteria may be used for comparing power statuses when both devices are powered by batteries. When both devices have the same relative power statuses, other criteria may be used to select between the devices. Those criteria, for example, may include functions of the devices, such as which device is more likely to require a connection to the other.

In the example of FIG. 8, processing at block 822 has resulted in the remote device being selected to perform the scanning. Accordingly, the wireless device communicates to the remote device both that it has been designated as an auto-connect device for the wireless device and that the task of scanning to determine whether the devices are in proximity has been delegated to the remote device.

At block 824, the remote device receives this information and stores it. In embodiments in which the remote device is a computing device, such as computing device 310 (FIG. 3), this information may be stored in a persistent device store, such as persistent device store 328. However, the specific mechanism by which the information is stored is not critical to the invention.

FIG. 8 illustrates operation of the wireless device and remote device over an interval of time. During that interval, one or more events may occur such that the connection between the wireless device and the remote device formed as a result of pairing in subprocesses 810 and 820 may be broken. The connection may be broken in any suitable way, including as a result of one or more of the devices being turned off, entering a sleep state or being moved out of range from the other. In the embodiment illustrated, following execution of block 822 on the wireless device and block 824 on the remote device, the connection between the wireless device and the remote device is broken, FIG. 8 shows method 800 resuming at block 830 at a later time when a connection between the wireless device and the remote device may automatically re-form. At block 830, the remote device is operating. In this example in which the task of scanning has been delegated to the remote device processing at block 830 includes the remote device transmitting messages to discover the wireless device. For example, processing at block 830 may include transmitting probes formatted to alert the wireless device that the remote device is in its vicinity. Such probe messages may be formatted in any suitable way. Such a probe message, for example, may be addressed specifically to the wireless device. Alternatively or additionally, the messages transmitted at block 830 may be formatted as broadcast or multicast message.

Regardless of the manner in which the messages are formatted, they may contain information that triggers the wireless device and remote device to form a connection. In some embodiments, the messages transmitted by the remote device may identify the remote device by way of a unique identifier, a device type, functionality or other characteristics that the wireless device may use to asses whether the remote device has been designated as an auto-connect device for the wireless device. Alternatively or additionally, the messages sent by the remote device may directly, based on information received and stored at block 824, identify the remote device as an auto-connect device for the wireless device.

Regardless of the specific format of the message transmitted at block 830, the remote device may repeatedly transmit such messages until the wireless device is in the vicinity of the remote device and in an operating state in which it detects the remote device based on the messages. The remote device may repeat the transmission of messages at block 830 in accordance with any suitable pattern. In some embodiments, the remote device may repeatedly transmit such messages in accordance with a scan pattern, which may be as described above in connection with any of FIGS. 5A . . . 5D. Though, it should be appreciated that any suitable pattern for repeated transmission of messages may be employed.

Regardless of the timing with which messages are repeated, the wireless device may, at block 832, detect the remote device by receiving a message sent by the remote device. At block 832, the wireless device may then identify, based on receipt of a message from the remote device, that the remote device is an auto-connect device in proximity to the wireless device. Thereafter, the wireless device automatically may perform sub-process 840. Sub-process 840 may entail transmission and receipt of messages that re-form a connection with the remote device. Sub-process 842 may be a corresponding sub-process performed by the remote device. Within sub-process 842, the remote device may exchange messages wirelessly with the wireless device that results in re-forming the connection with the wireless device.

The messages exchanged within sub-processes 840 and 842 may be formatted in any suitable way. In some embodiments, the messages may be formatted in accordance with a peer-to-peer protocol. The peer-to-peer protocol may support persistent groups. In such an embodiment, the messages exchanged within sub-processes 840 and 842 may be based on information stored in their persistent group profiles or other suitable stores of information on the wireless device and the remote device.

Though FIG. 8 shows method 800 ending after execution of the sub-processes 840 and 842, operation of both the wireless device and remote device may continue on after the connection is re-formed in sub-processes 840 and 842. Subsequent operation of the devices may entail exchanging information over that connection for any suitable purpose, including purposes as described above.

Figure 9:
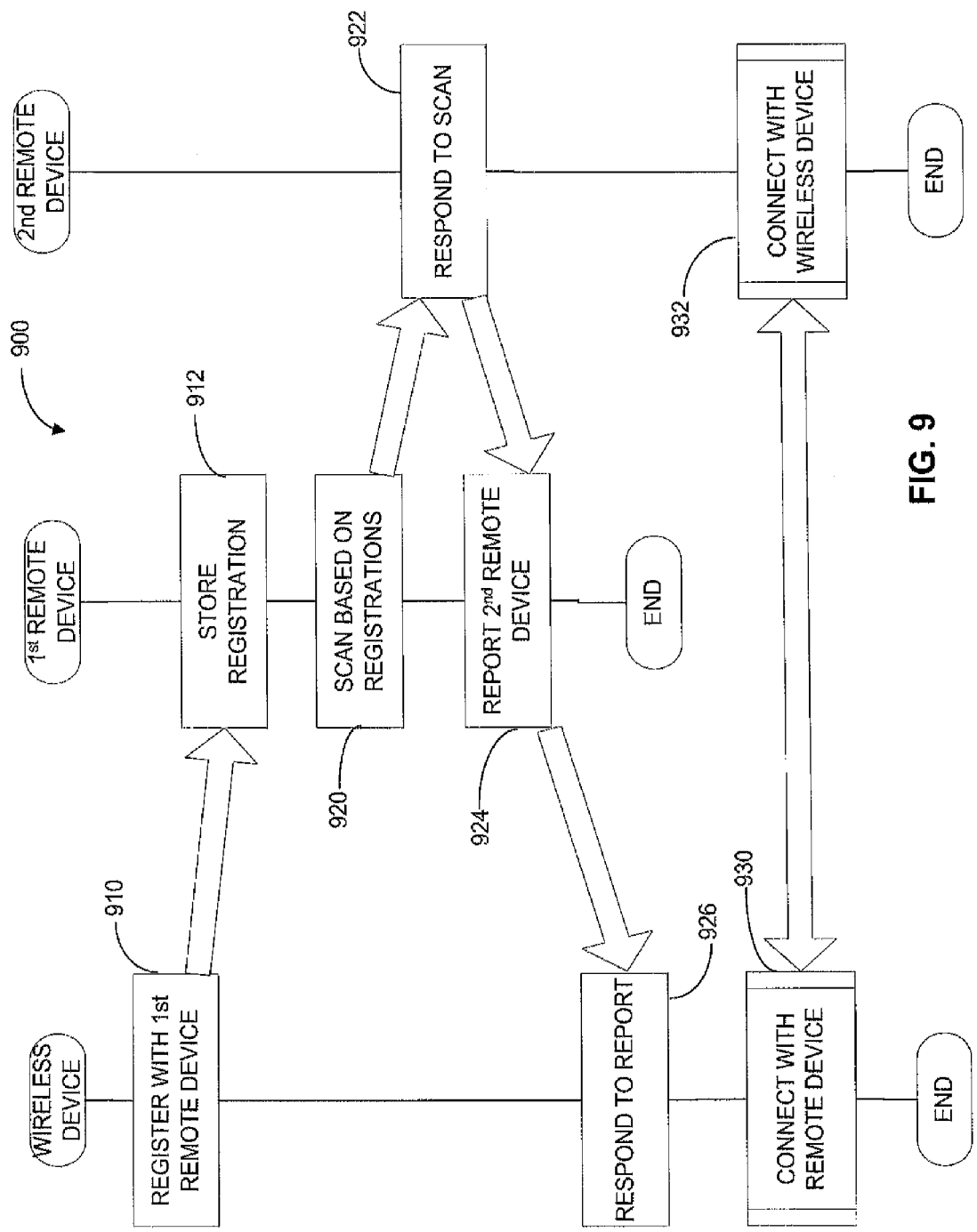
FIG. 9 is a flow chart of an exemplary method of operation of devices in which the task of discovering devices to automatically form a connection is delegated to an intermediary device.

FIG. 9 illustrates yet another method by which wireless devices may operate to automatically form a connection. In the example of FIG. 9, a method 900, involving operation of multiple wireless devices is illustrated. In this example, operation of three wireless devices is illustrated. Though, the specific number of wireless devices operating together to perform the method 900 is not critical to the invention.

In this example, the task of scanning for auto-connect devices is delegated from a wireless device to a first remote device, acting as a proxy device. The first remote device may scan for a second remote device that has been designated as an auto-connect device for the wireless device. As a specific example, the wireless device may be a computing device, such as computing device 110F (FIG. 1F). The second remote device may be a peripheral intended to operate with the computing device, such as keyboard 130F (FIG. 1F). The first remote device may be a device operating from a source of AC power, such as display 134F (FIG. 1F), that is functionally related to and is likely to be in the vicinity of the second remote device. However, the nature of the wireless devices that collectively perform the method 900 is not critical to the invention, and any suitable devices may be used.

In the example of FIG. 9, method 900 begins at block 910, which is performed by the wireless device. At block 910, the wireless device transmits wireless messages to register with the first remote device. The messages transmitted at block 910 may be in any suitable format and may contain any suitable information. For example, the messages may contain an information element identifying the message as being an auto-connect registration message. Alternatively or additionally, the messages may identify the wireless device, revealing to the first remote device that the wireless device is in its vicinity. Alternatively or additionally, the messages transmitted at block 910 may identify the second remote device, indicating to the first remote device that the wireless device should receive a report when the second remote device is also in the vicinity of the first remote device.

The registration messages sent at block 910 may be sent in response to any suitable trigger event. For example, the wireless device, when it enters an active operational state, may transmit repeatedly the registration messages such that the first remote device will receive such a message whenever the wireless device is brought into close proximity with the first remote device. Alternatively, though not illustrated expressly in FIG. 9, the first remote device may periodically transmit an indication of its presence. For example, the first remote device may from time to time broadcast a beacon or other suitable message that alerts the wireless device to the presence of the first remote device when the wireless device comes into proximity with the first remote device.

Regardless of the criteria that triggers sending of a registration message at block 910, when such a message is sent, it may be received by the first remote device at block 912. At block 912, the first remote device may store information based on the registration message. This information may be used by the first remote device to identify devices that it is to discover and report to other devices.

In this example, at block 920, the first remote device uses the information stored at block 912 to detect a second remote device that is an auto-connect device for the wireless device. The specific format of the messages sent at block 920 is not critical to the invention. For example, the messages sent at block 920 may be formatted as queries as described above in connection with any of FIGS. 5A . . . 5D. The queries may be directed to specific devices or to devices generally based on type, functionality or other characteristics.

Though FIG. 9 illustrates interaction of only three devices, the first remote device may serve as a proxy for more than one wireless device. Furthermore, the first remote device may scan for more than one device that has been designated as an auto-connect device. Accordingly, scanning at block 920 may be performed in accordance with a scan pattern that allows for the first remote device to detect whether any of multiple possible remote devices is in the vicinity of the first remote device.

Regardless of the format of the messages sent at block 920, the second remote device may receive and respond to such a message at block 922. The response may be in any suitable format. For example, the response transmitted by the second remote device at block 922 may indicate, simply by timing of the response, an association with a query for a device transmitted at block 920. Alternatively or additionally, the response transmitted at block 922 may contain information expressly identifying the second remote device and/or expressly identify the wireless device.

Regardless of the specific content of the response message, the first remote device may receive the response at block 924. Based on the content of the message, the first remote device may identify, based on the registration information stored at block 912, that the second remote device has been designated as an auto-connect device for the wireless device. When such a relationship is identified, the first remote device may transmit at block 924 a further message that indicates to the wireless device that a device designated as an auto-connect device for the wireless device is in proximity to the wireless device. This information may be conveyed from the first remote device to the wireless device in any suitable form. For example, the message sent at block 924 may contain a unique identifier for the second remote device. Alternatively or additionally, the message transmitted at block 924 may contain information about the type, functionality or other characteristics of the second remote device to enable the wireless device to identify that an auto-connect device is in proximity to it. As a further example of a possible message format, the message sent at block 924 may be formatted as a Wake on LAN message as is known in the art. This format may allow the wireless device to respond even if in a low power sleep state.

Regardless of the content of the report sent at block 924, the wireless device may respond to such a report at block 926. The processing at block 926 may be in any suitable form. For example, the wireless device may determine, based on the report received, whether the second remote device has been designated as an auto-connect device for it. Alternatively or additionally, processing at block 926 may determine whether the wireless device is operating in a context in which it has been configured to form an auto-connection with the second remote device.

In the example of FIG. 9, processing at block 926 results in a determination on the wireless device that the wireless device should automatically connect with the second remote device. Accordingly, method 900 proceeds to sub-process 930. Within sub-process 930, the wireless device transmits and receives messages wirelessly to form a connection with the second remote device. The second remote device may concurrently execute sub-process 932. In sub-process 932, the second remote device may exchange wireless messages with the wireless device. The messages exchanged at sub-processes 930 and 932 may be formatted in any suitable way. In some embodiments, the messages may be formatted in accordance with a peer-to-peer protocol.

Though FIG. 9 shows method 900 after a connection is formed, operation of the devices may continue with one or more of the devices using the connection, including in ways described above or any other suitable way.

Figure 10:
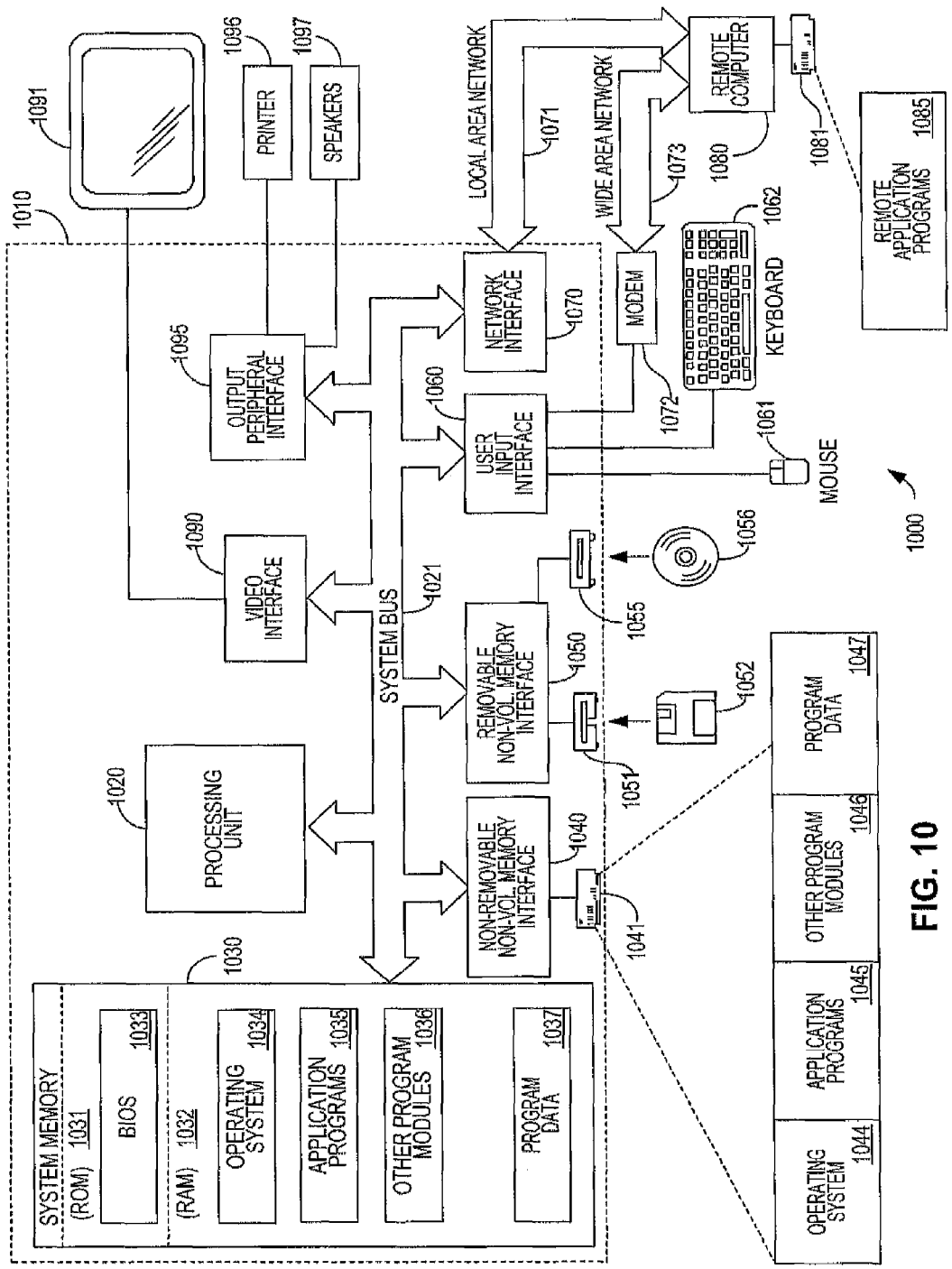
FIG. 10 is a sketch of an illustrative computing device in which some embodiments of the invention may be practiced.

As can be seen from the foregoing, any suitable technique or techniques may be employed to identify devices for auto-connection. Similarly, any suitable techniques may be used to automatically form connections with these devices without an express user command. These techniques may be performed by operation of any suitable devices. FIG. 10 illustrates an example of a suitable device, which may operate as a user device or a remote device.

FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1010. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art. For example, a device through which a user provides input designating one or more auto-connect devices has been called a wireless device and other devices have been referred to as remote devices. Such designation is for simplicity of illustration, and any suitable device may perform any role in any operating process.

Further, examples have been provided in which a wireless device is a group owner and remote devices are clients of the group owner. While such device functionality may be useful in many embodiments, the invention is not limited to operation within wireless devices with these roles.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a wireless computing device having a display displaying a user interface, the method comprising:

wirelessly communicating in accordance with a peer-to-peer protocol to identify a plurality of remote devices;

displaying the user interface, the user interface comprising graphic representations of the respective remote devices in association with respective controls to accept user input designating the remote devices for auto-connection in accordance with the peer-to-peer protocol;

receiving through the user interface a designation of a device that is one of the remote devices, and in response storing, in a persistent store comprising information about the remote devices, an auto-connect designation designating the remote device as an auto-connect device; and detecting, according to a message conforming to the peer-to-peer protocol from the remote device, the remote device which is in proximity to the wireless computing device, and automatically responding to the message by determining whether to perform an auto-connect operation with the remote device in response to the message, wherein the message was sent as part of a connection re-establishment procedure of the peer-to-peer protocol to re-establish a connection between the remote device and the wireless computing device, the determining performed by:

based on information in the message identifying the remote device, determining from the auto-connect designation in the persistent store that the remote device is designated for auto-connection;

identifying a current environment of the wireless computing device and determining that the identified current environment meets an environment requirement associated with the auto-connect operation; and in further response to receiving the message, and in response to both the determining that the remote device is designated for auto-connection and the determining that the current environment meets the environment requirement, performing the auto-connect operation in accordance with the peer-to-peer protocol to reestablish a connection with the remote device according to the peer-to-peer protocol without requiring a user input to reestablish the connection.

2. The method of claim 1, further comprising:

wirelessly communicating with the remote device at a first time; and displaying the user interface at a second time that is later than the first time.

3. The method of claim 2, wherein:

wirelessly communicating comprises pairing with the remote device in accordance with the peer-to-peer protocol.

4. The method of claim 3, wherein:

rendering on the user interface comprises rendering representations of a plurality of remote devices with which the wireless computing device has paired.

5. A method according to claim 1, wherein the environment condition comprises a type of locale of the wireless computing device.

6. A method according to claim 1, wherein the peer-to-peer protocol comprises a protocol in which indicia of a peer-to-peer group is persistently maintained in participating peer devices when connectivity with the group is lost, and wherein determining whether to perform an auto-connect procedure depends on the persisted indicia.

7. A method according to claim 6, wherein the peer-to-peer protocol comprises a WiFi Direct protocol.

8. A method according to claim 1, wherein the identified current environment comprises one of a plurality of pre-defined environments identifiable by the wireless computing device, the pre-defined environments comprising a home environment, a work environment, and a public environment.

9. A wireless device comprised of:

processing hardware, storage hardware, and a radio;

the storage hardware storing instructions configured to cause the processing hardware to attempt to auto-connect, in accordance with an auto-connect procedure of a peer-to-peer wireless protocol, to remote devices by:
- broadcasting, by the radio, a message conforming to a wireless peer-to-peer protocol, the message comprising a part of the auto-connect procedure of the peer-to-peer wireless protocol;
- determining, by the processing hardware, a type of locale in which the wireless device is currently operating;
- receiving, by the processing hardware via the radio, from a remote device, a response message corresponding to the broadcasted message, the response message conforming with the peer-to-peer wireless protocol and comprising part of the auto-connect procedure of the peer-to-peer wireless protocol, and determining, from information in the response message, a device type of the remote device, wherein the response message conforms to the peer-to-peer wireless protocol; and
- responding to receiving the response message by making a determination that (i) the device type determined from information in the response message is suitable for auto-connecting, and (ii) the determined type of locale is a locale type that is suitable for performing the auto-connect procedure of the peer-to-peer wireless protocol, and responding to the determination of (i) and (ii) by performing the auto-connect procedure to automatically re-form a peer-to-peer connection with the remote device, and, in accordance with the peer-to-peer wireless protocol, without requiring user input, wherein the peer-to-peer connection is re-formed through the radio with the remote device according to the peer-to-peer wireless protocol.

10. A wireless device according to claim 9, wherein: determining the type of locale comprises differentiating between whether the wireless device is operating in a first type of environment or is operating in a second type of environment, wherein the type of locale is the first type of environment, and wherein the apparatus comprises logic that, if executed by the processing hardware, would determine that the second type of environment is not suitable for auto-connecting.

11. A wireless device according to claim 9, wherein: determining the type of locale comprises determining whether the wireless device is located in a home setting.

12. A wireless device according to claim 9, wherein re-forming the peer-to-peer connection comprises:
re-forming the peer-to-peer connection with the remote device when the remote device is determined to be a human interface device and the type of locale is determined to correspond a home setting.

13. A wireless device according to claim 9, further comprising:
logic configured to not re-form the peer-to-peer connection with the remote device if the remote device is not determined to be a human interface device.

14. A wireless device according to claim 9, wherein:
the type of locale is determined based on an identity of another wireless device detected by the apparatus.

15. A wireless device according to claim 9, wherein the current environment is identified by identifying a device in the current environment.

16. A method of managing auto-connecting by a wireless computing device, the method performed by the wireless computing device and comprising:
- maintaining a store of profiles for respective wireless devices that have paired and connected with the wireless computing device using a peer-to-peer wireless protocol, the peer-to-peer wireless protocol comprising a version of the WiFi Direct protocol, the maintaining comprising updating or storing the profiles to include respective auto-connect designations for the wireless devices;
- responsive to the wireless computing device receiving a message sent by a given one of the wireless devices, determining whether to automatically reconnect, without input from a user, with the given wireless protocol in accordance with an auto-connect procedure defined by the peer-to-peer wireless protocol, the message having been sent in accordance with the auto-connect procedure, the determining comprising:
  - based on information in the message identifying the given wireless device, selecting, from among the profiles, a profile corresponding to the given wireless device, and in further response to receipt of the message, making a first determination that the selected profile includes an auto-connect designation; and
  - making a second determination that an auto-connect environment requirement is satisfied by information indicating a current environment of the wireless computing device; and
- in further response to receipt of the message, based on the first determination and on the second determination, automatically reconnecting with the given wireless device according to the auto-connect procedure of the peer-to-peer wireless protocol without requiring user input.

17. A method according to claim 16, further comprising providing a user interface that allows user inputs to associate the auto-connect designations with the respective wireless devices.

18. A method according to claim 16, wherein the message comprises a probe transmitted by the given wireless device.

19. A method according to claim 16, wherein the message comprises a reply transmitted by the given wireless device in response to a probe transmitted by the wireless computing device.

20. A method according to claim 16, wherein the profile corresponding to the given wireless device comprises a group profile associated with multiple wireless devices.

21. A method according to claim 16, wherein the current environment is identified as a type of room or is identified as a type of locale that is at least a public locale or a non-public locale.

* * * * *